US008179423B2

(12) United States Patent
Maruyama et al.

(10) Patent No.: US 8,179,423 B2
(45) Date of Patent: May 15, 2012

(54) IMAGE DISPLAY SYSTEM, AN IMAGE DISPLAY METHOD, A CODING METHOD, AND A PRINTED MATTER FOR STEREOSCOPIC VIEWING

(75) Inventors: Go Maruyama, Tokyo (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1668 days.

(21) Appl. No.: 11/506,792

(22) Filed: Aug. 21, 2006

(65) Prior Publication Data

US 2007/0273761 A1 Nov. 29, 2007

(30) Foreign Application Priority Data

Aug. 22, 2005 (JP) .................................. 2005-240235

(51) Int. Cl.
*H04N 13/00* (2006.01)
(52) U.S. Cl. ............... 348/42; 348/51; 348/53; 348/115
(58) Field of Classification Search .............. 348/42–53, 348/65, 115
See application file for complete search history.

(56) References Cited

U.S. PATENT DOCUMENTS

| 6,034,653 | A * | 3/2000 | Robertson et al. ................. 345/8 |
| 6,151,060 | A * | 11/2000 | Tabata ............................. 348/51 |
| 6,181,304 | B1 * | 1/2001 | Robinson et al. ................. 345/8 |
| 6,236,428 | B1 * | 5/2001 | Fukushima ..................... 348/42 |
| 6,324,001 | B2 * | 11/2001 | Tabata .......................... 359/462 |
| 6,449,309 | B1 * | 9/2002 | Tabata ...................... 375/240.01 |
| 6,657,655 | B1 * | 12/2003 | Iizuka et al. .................... 348/47 |
| 6,822,643 | B2 * | 11/2004 | Matsui et al. ................. 345/204 |
| 7,493,153 | B2 * | 2/2009 | Ahmed et al. ................ 600/407 |
| 7,565,003 | B2 * | 7/2009 | Ashizaki et al. .............. 382/154 |
| 2003/0030734 | A1 * | 2/2003 | Gibbs et al. ................... 348/239 |
| 2003/0043262 | A1 * | 3/2003 | Takemoto et al. .............. 348/46 |
| 2006/0072175 | A1 * | 4/2006 | Oshino ......................... 358/537 |

FOREIGN PATENT DOCUMENTS

| JP | 1-65579 | 4/1989 |
| JP | 2000-347132 | 12/2000 |
| JP | 2003-189208 | 7/2003 |

OTHER PUBLICATIONS

Sakamoto, K., 3-D Information Display System Using Monocular Multi-View Displays, 2002, Stereoscopic Displays and Virtual Reality System IX, Preceedings of SPIE, vol. 4660, pp. 367-374.*

* cited by examiner

*Primary Examiner* — Joseph Ustaris
*Assistant Examiner* — Hang Gao
(74) *Attorney, Agent, or Firm* — Oblon, Spivak, McClelland, Maier & Neustadt, L.L.P.

(57) ABSTRACT

An image display system, an image display method, a coding method, and a printed matter for stereoscopic viewing are disclosed. The image display system includes a real image presentation unit for showing a first view image of the stereoscopic image as a real image, and a virtual image presentation unit for showing a second view image of the stereoscopic image as a virtual image, the second view image being based on the first view image. When the first view image is viewed by one eye of a viewing person, and the second view image is viewed by the other eye of the viewing person, the first view image and second view image together form the stereoscopic image.

15 Claims, 20 Drawing Sheets

FIG.3
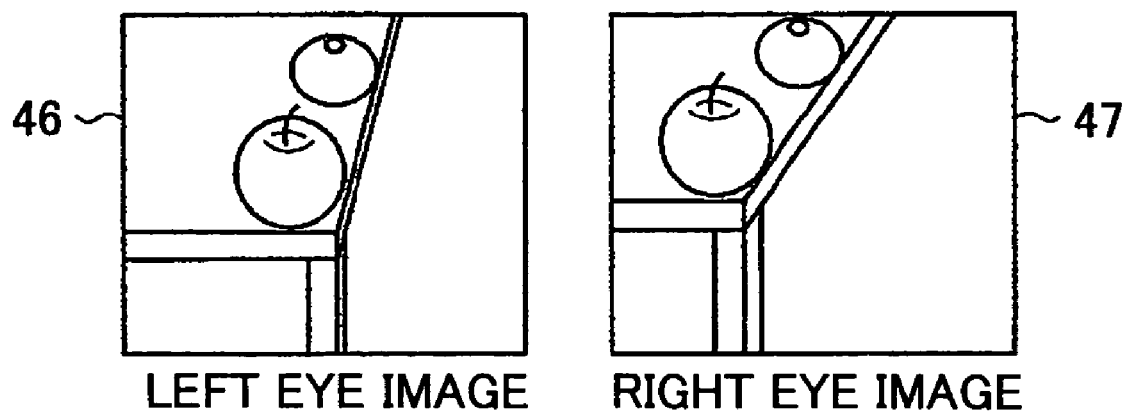
LEFT EYE IMAGE     RIGHT EYE IMAGE
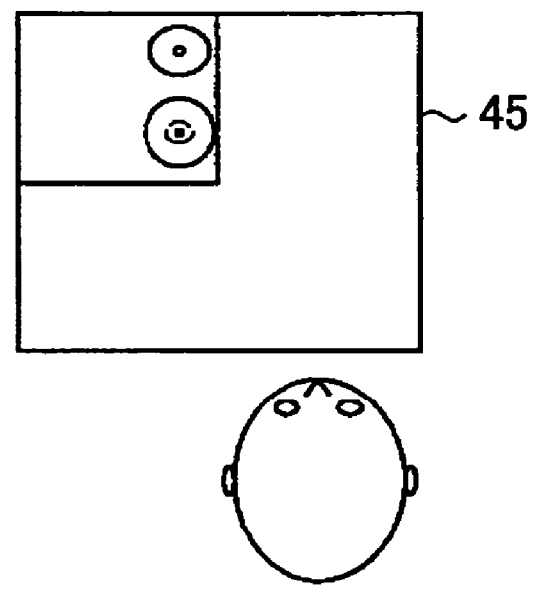

FIG.7
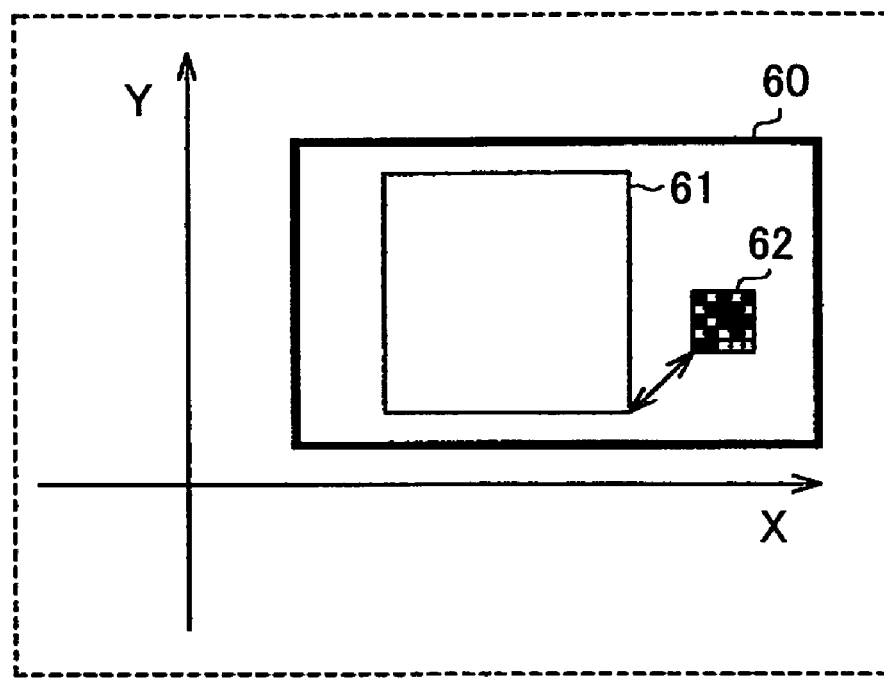
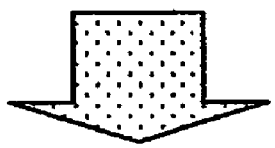
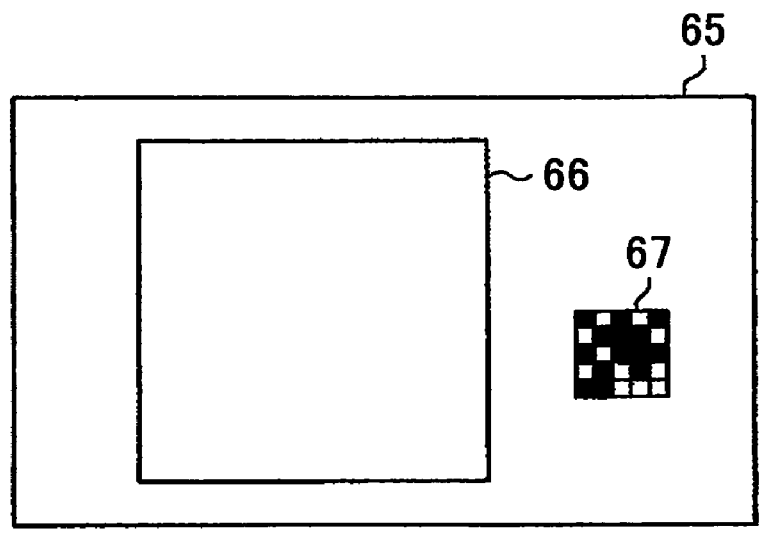

FIG.8

| 13 | 14 | 10 | 9 |
|----|----|----|----|
| 14 | 13 | 8  | 7 |
| 13 | 14 | 7  | 5 |
| 12 | 14 | 6  | 5 |

STEREOSCOPIC
IMAGE FOR LEFT EYE — 70

| 13 | 13 | 12 | 9 |
|----|----|----|----|
| 13 | 13 | 12 | 6 |
| 14 | 13 | 12 | 5 |
| 12 | 12 | 10 | 4 |

STEREOSCOPIC
IMAGE FOR RIGHT EYE — 71

| 0  | −1 | 2 | 0  |
|----|----|---|----|
| −1 | 0  | 4 | −1 |
| 1  | −1 | 5 | 0  |
| 0  | −2 | 4 | −1 |

DIFFERENCE IMAGE — 72

FIG.13
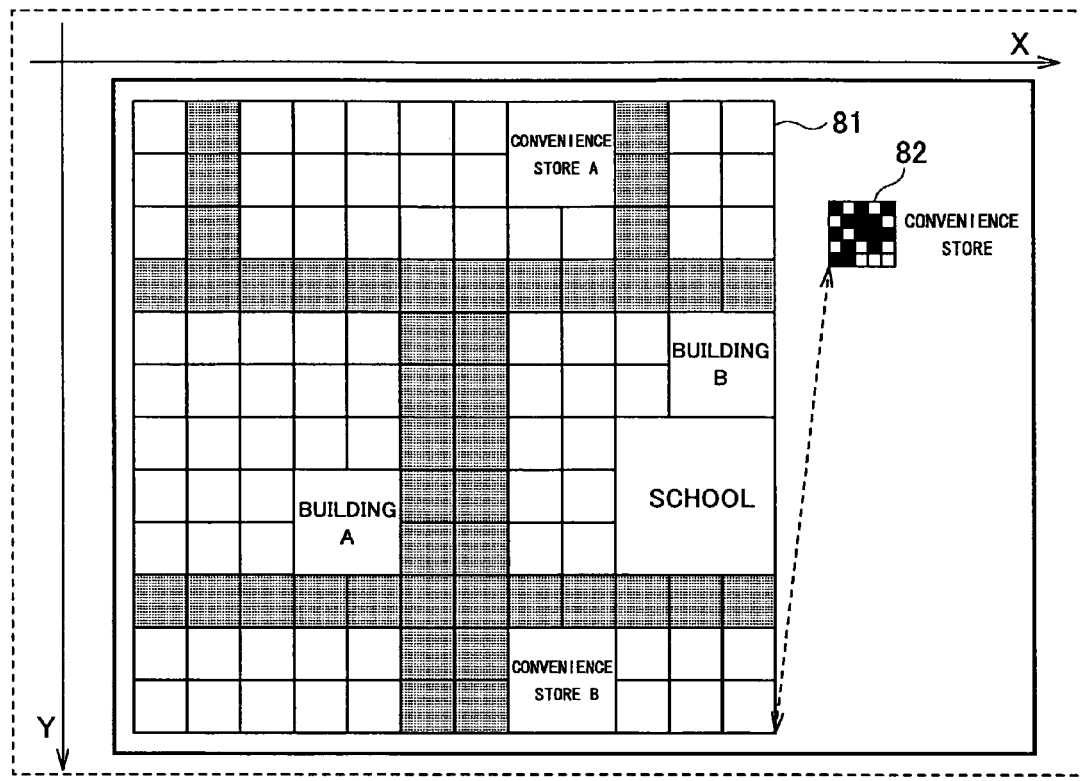
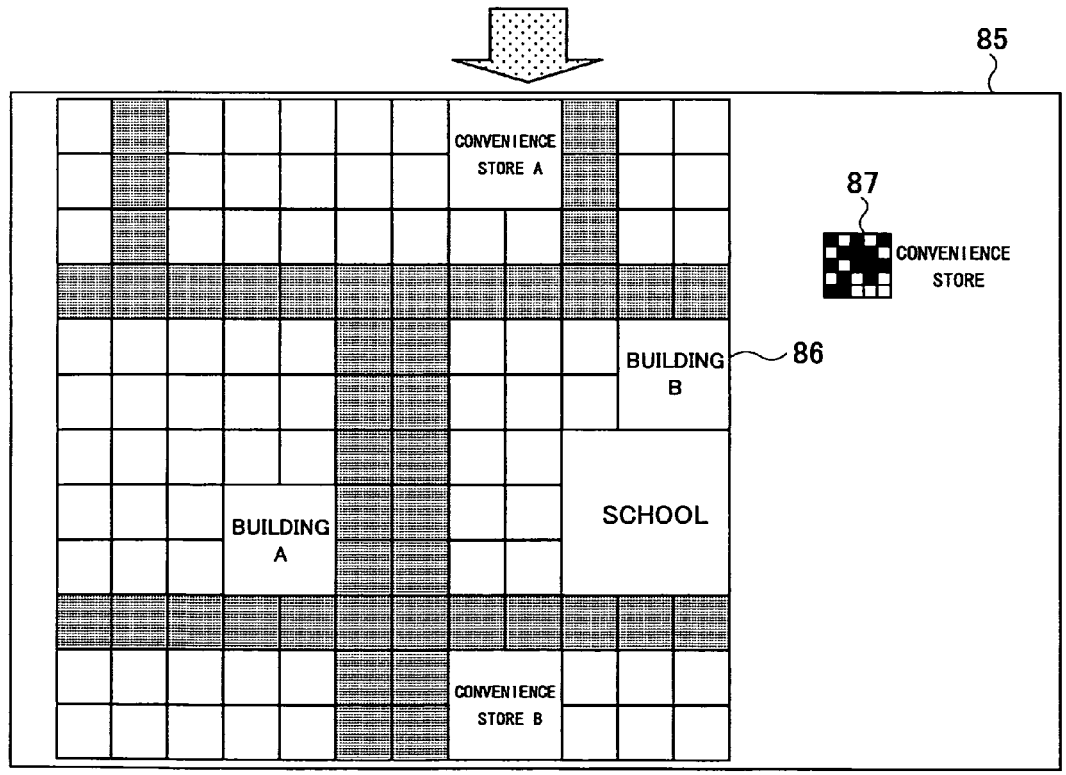

FIG.16
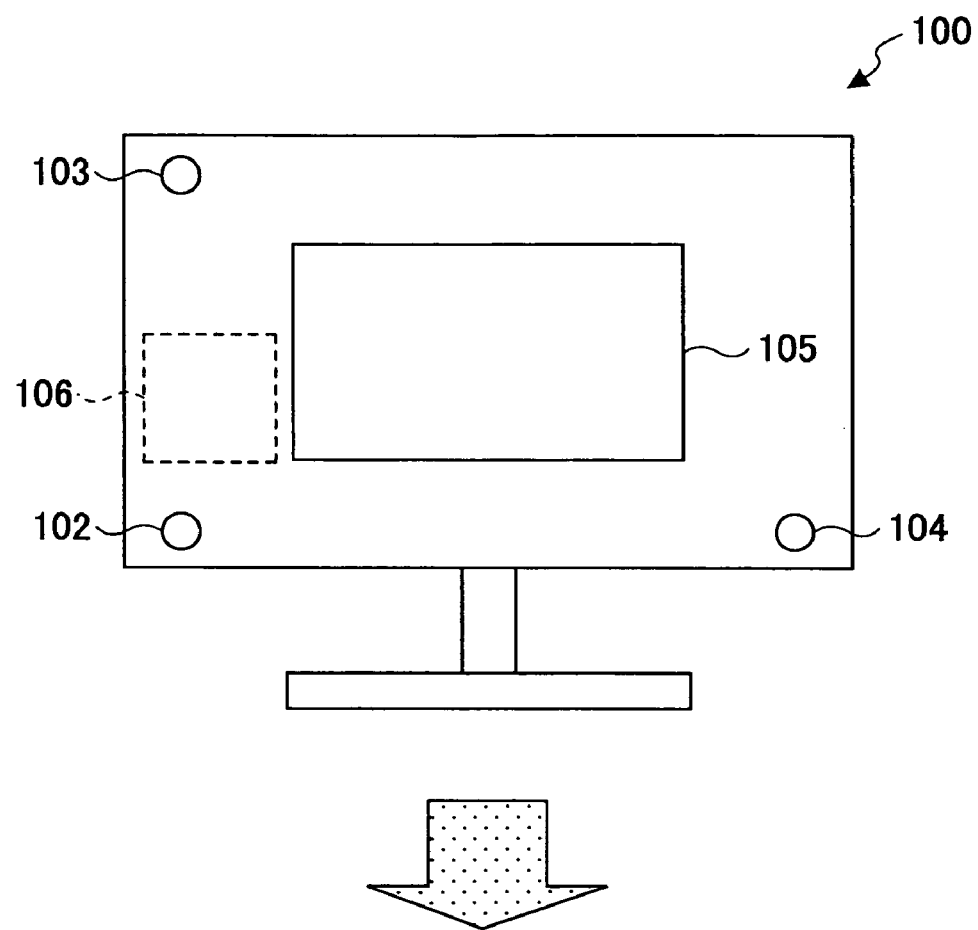
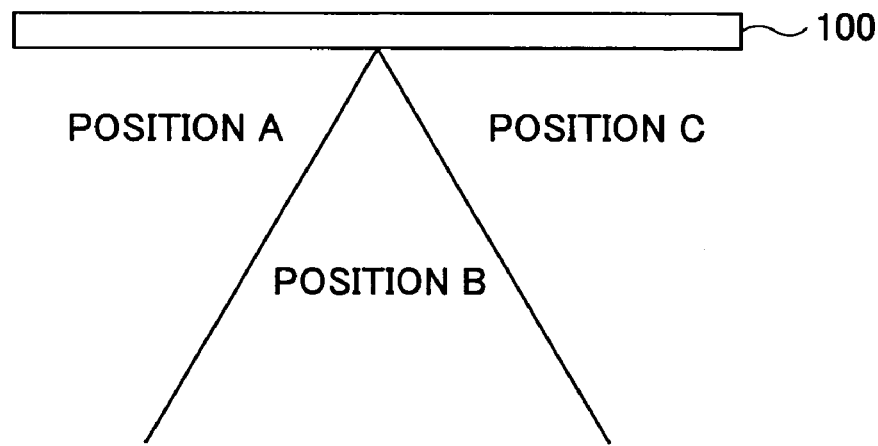

IMAGE DISPLAY SYSTEM, AN IMAGE DISPLAY METHOD, A CODING METHOD, AND A PRINTED MATTER FOR STEREOSCOPIC VIEWING

BACKGROUND OF THE INVENTION

1. Field of the Invention

The present invention relates to an image display system, an image display method, a coding method, and a printed matter for stereoscopically viewing a 2-dimensional image.

2. Description of the Related Art

There are various image display systems for displaying or stereoscopically viewing a 3-dimensional object. Such image display systems can be classified into two groups, one being such as a parallax barrier system that does not require special glasses, and the other using special glasses such as liquid crystal shutter glasses and polarization glasses for both eyes (for example, Patent Reference 1). Patent Reference 1 discloses a system that includes an image display unit for displaying a parallax image, a deflection control unit for controlling deflection of display directivity of the parallax image in sync with the parallax image such that a horizontal single eye parallax image is displayed, and a headset that is worn by a viewing person at the head or the face for displaying a vertical single eye parallax image in sync with the image display unit.

[Patent Reference 1] JPA 2000-347132 (pp. 4-7)

DESCRIPTION OF THE INVENTION

Problem(s) to be Solved by the Invention

According to the conventional technology as described above, if the viewing person has to wear glasses (i.e., for both eyes), he/she cannot see surrounding circumstances, and he/she cannot efficiently walk or act otherwise. Further, it is difficult to share the same stereoscopic image by two or more persons. For example, even if the same stereoscopic image may be viewed by the persons, one cannot tell which portion of the image another is viewing. Certainly, it is possible to use an AR technology such that the other person is superposed in the image being displayed. Nevertheless, it is difficult to provide a feeling of reality. Further, if wearing the glasses is not required, the viewing person has to stay at a predetermined position according to the conventional technology. If the viewing person moves from the predetermined position, physiological sense of discomfort and unpleasantness may arise.

SUMMARY OF THE INVENTION

The present invention provides an image display system, an image display method, a coding method, and a printed matter for stereoscopic viewing that substantially obviate one or more of the problems caused by the limitations and disadvantages of the related art.

More specifically, according to the present invention, stereoscopic viewing is provided to a viewing person with one of his/her eyes being kept available for viewing the external world, and he/she can move without losing comfortable stereoscopic viewing. That is, flexible stereoscopic viewing is provided.

Features of embodiments of the present invention are set forth in the description that follows, and in part will become apparent from the description and the accompanying drawings, or may be learned by practice of the invention according to the teachings provided in the description. Problem solutions provided by an embodiment of the present invention will be realized and attained by an image display system, an image display method, a coding method, and a printed matter for stereoscopic viewing particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides an image display system, an image display method, a coding method, and a printed matter for stereoscopic viewing as follows.

Means for Solving the Problem

A preferred embodiment of the present invention provides an image display system for stereoscopic viewing a stereoscopic image, including:

a real image presentation unit for showing a first view image of the stereoscopic image as a real image; and a virtual image presentation unit for showing a second view image of the stereoscopic image as a virtual image, the second view image being based on the first view image;

wherein the first view image is viewable by one eye of a viewing person, and the second view image is viewable by the other eye of the viewing person, which first view image and second view image together form the stereoscopic image.

According to an aspect of the present invention, the real image presentation unit is a printed matter.

According to another aspect of the present invention, the real image presentation unit is a display unit.

According to an aspect of the present invention, the virtual image presentation unit displays the second view image, serving as the as virtual image, based on an image photographed by an image pick-up unit According to another aspect of the present invention, the virtual image presentation unit includes an image pick-up unit for taking an image of a code image that indicates an address, such as a URL, of the second view image, and the virtual image presentation unit shows the second view image, serving as the virtual image, stored at the address that the code image photographed by the image pick-up unit indicates.

According to another aspect of the present invention, the virtual image presentation unit includes an image pick-up unit for taking an image of the first view image and a code image, the code image containing data representing differences between the first view image and the second view image, and the virtual image presentation unit generates the second view image based on the first view image and the code image that are photographed by the image pick-up unit, and shows the second view image as the virtual image.

According to another aspect of the present invention, the virtual image presentation unit includes an image pick-up unit for taking an image of the first view image and a code image, the code image containing data representing a portion of the first view image that is to be shown with an elevation using parallax, and the virtual image presentation unit generates the second view image based on the first view image and the code image that are photographed by the image pick-up unit, and shows the second view image as the virtual image.

According to another aspect of the present invention, the real image presentation unit presents two or more first view images corresponding to different positions as the real image, and the virtual image presentation unit presents the second view image, serving as the virtual image, corresponding to the first view image shown by the real image presentation unit.

According to another aspect of the present invention, the real image presentation unit presents the first view image as the real image according to a position relation between the virtual image presentation unit and the real image presentation unit, and the virtual image presentation unit presents the second view image as the virtual image corresponding to the first view image according to the position relation between the virtual image presentation unit and the real image presentation unit.

According to another aspect of the present invention, the virtual image presentation unit is a head wearing type single eye display unit.

According to another aspect of the present invention, the image display system includes a relative position determining unit for determining a relative position between the virtual image presentation unit and the real image presentation unit.

According to another aspect of the present invention, the relative position determining unit includes an image pick-up unit.

According to another aspect of the present invention, the image display system includes a display data transforming unit for carrying out projective transformation on display data of the second view image shown by the virtual image presentation unit.

According to another aspect of the present invention, the image display system includes a display data status selecting unit for carrying out projective transformation on display data of the second view image displayed by the virtual image presentation unit according to an operation of the viewing person, and for the viewing person to select a state of the display data.

According to another aspect of the present invention, the image display system includes a relative position determining unit for determining a relative position between the virtual image presentation unit and the real image presentation unit, and a display data automatic transformation unit for automatically carrying out the projective transformation on the display data of the second view image shown by the virtual image presentation unit based on information about the selection of the user by the display data status selecting unit and based on the relative position.

The embodiment of the present invention further provides an image display method for stereoscopic viewing a stereoscopic image, including:

using a real image presentation unit for showing a first view image of the stereoscopic image as a real image, and using a virtual image presentation unit for showing a second view image of the stereoscopic image as a virtual image, the second view image being based on the first view image;

wherein the first view image, when viewed by one eye of a viewing person, and the second view image, when viewed by the other eye of the viewing person, together form the stereoscopic image.

According to an aspect of the present invention, the image display method includes a step of generating a code image that contains coded information about a relative position and relative size between the code image and the stereoscopic image, the code image being appended to the stereoscopic image.

An aspect of the present invention provides a printed matter for stereoscopic viewing, on which printed matter a first view image in consideration of parallax with reference to a second view image is printed, comprising:

a code image being printed on the printed matter, the code image indicating an address of the second view image.

Another aspect of the present invention provides the printed matter for stereoscopic viewing wherein the code image contains data representing differences between the first view image and the second view image.

Another aspect of the present invention provides the printed matter for stereoscopic viewing wherein the code image contains data expressing a portion of the first view image, which portion is viewed with an elevation by parallax by moving the portion in the virtual image.

Another aspect of the present invention provides the printed matter for stereoscopic viewing, wherein the code image contains data expressing a portion of the first view image, which portion is viewed with an elevation by parallax by moving the portion in the virtual image.

Effect of the Invention

According to one or more embodiments of the present invention, flexible stereoscopic viewing is obtained, the viewing person being capable of seeing the external world by one of the two eyes, and individual physical differences being adjusted.

BRIEF DESCRIPTION OF THE DRAWINGS

FIG. 3 is a schematic diagram of images viewed by each of the eyes;

FIG. 7 is a schematic diagram showing a stereoscopic image printed on paper;

FIG. 8 gives pixel maps showing a difference image obtained from a stereoscopic image (for the right eye) and a stereoscopic image (for the left eye);

FIG. 13 is a schematic diagram explaining printing a map on the paper;

FIG. 16 is a schematic diagram showing a position of the viewing person according to the fourth embodiment;

DESCRIPTION OF THE PREFERRED EMBODIMENTS

In the following, embodiments of the present invention are described with reference to the accompanying drawings.

First Embodiment

In the following, the first of embodiments that realize one or aspects of the present invention is described with reference to FIG. 1 through FIG. 4. An image display system, an image display method, and a printed matter for stereoscopic viewing according to the first embodiment are described, whereby a viewing person obtains flexible stereoscopic viewing with one of his/her eyes being available for seeing the external world. According to the first embodiment, a first view image and a second view image are prepared, considering parallax. Then, the first view image is printed on paper (printed matter for stereoscopic viewing) to be viewed with one eye, and the second image is displayed by a head mount display to be viewed by the other eye. More specifically, a 2-dimensional code representing identification information of the first view image data is printed on the paper (printed matter for stereoscopic viewing) in addition to the first view image that represents a real image. The first view image on the printed matter for stereoscopic viewing is seen by one eye of the viewing person. The second view image is provided by a server based on the identification information specified by the 2-dimensional code, is displayed by the head mount display, and is viewed by the other eye of the viewing person. In this way, the stereoscopic viewing is made possible. That is, the printed matter for stereoscopic viewing constitutes a real image presentation unit according to the present embodiment. Further, the head mount display constitutes a virtual image presentation unit. In this specification, an image that can be seen without using a virtual image presentation unit is called a real image, and an image displayed by the virtual image presentation unit is called a virtual image.

Figure 1:
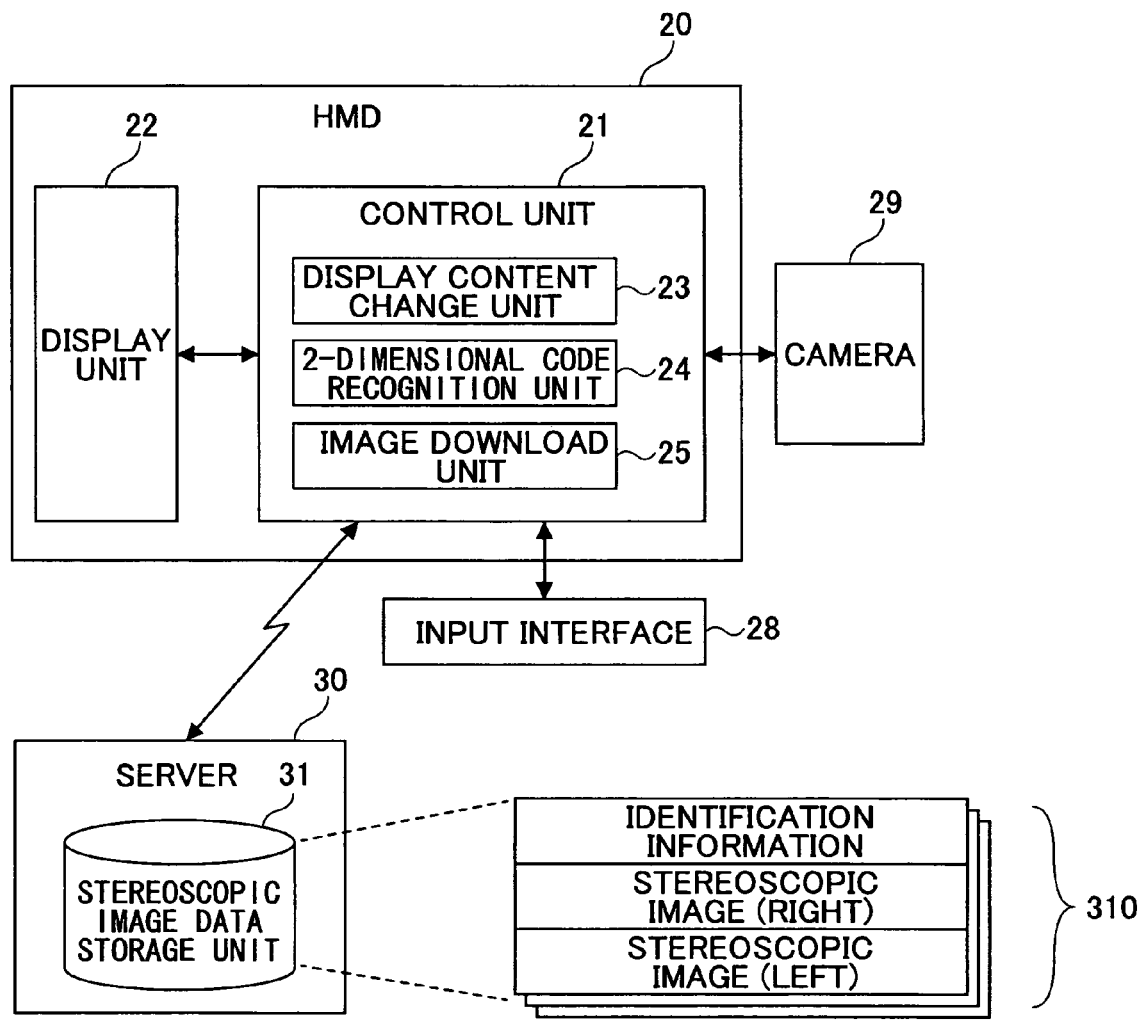
FIG. 1 is a block diagram of an image display system according to a first embodiment of the present invention.

As shown in FIG. 1, the head mount display is called HMD 20, and includes a control unit 21 and a display unit 22 that is connected to the control unit 21. The control unit 21 includes a display content change unit 23, a 2-dimensional code recognition unit 24, and an image downloading unit 25. The control unit 21 includes CPU, RAM, and ROM (not illustrated), and performs a process that is described below. The display content change unit 23, the 2-dimensional code recognition unit 24, and the image downloading unit 25 of the control unit 21 carry out functions according to a program for the process.

The display content change unit 23 adjusts an image displayed on the display unit 22 by carrying out projective transformation (a rotational conversion, and a parallel conversion) of the image according to an operation of an input interface 28 by the viewing person. That is, the display content change unit 23 functions as a display data deformation unit and a display data status selection unit.

The 2-dimensional code recognition unit 24 determines whether there is identification information in an image that has been photographed with an image pick-up unit such as a camera 29. If the determination is affirmative, the 2-dimensional code recognition unit 24 directs the image downloading unit 25 to start processing.

Then, the image downloading unit 25 downloads a stereo (virtual) image identified by the identification information from a server 30, and displays the stereo (virtual) image on the display unit 22.

The display unit 22 is for displaying information processed by the control unit 21.

Further, the control unit 21 is connected to the camera 29 that takes an image of the paper 40 (refer to FIG. 2) through a lens. The camera 29 is arranged in a position such that an image pick-up plane thereof is in parallel with the display unit 22, and the center of the optical axis thereof is in agreement with the center of the display unit 22. The image taken by the camera 29 is provided to the control unit 21.

Further, the control unit 21 is connected to the input interface 28. The input interface 28 includes a pointing device, such as a mouse, for adjusting an image displayed on the display unit 22.

Here, the HMD 20 is connected to the server 30 by a cable and/or radio. The server 30 includes CPU, RAM, ROM (not illustrated), a stereoscopic image data storage unit 31, and a communicating unit (not illustrated).

Figure 2:
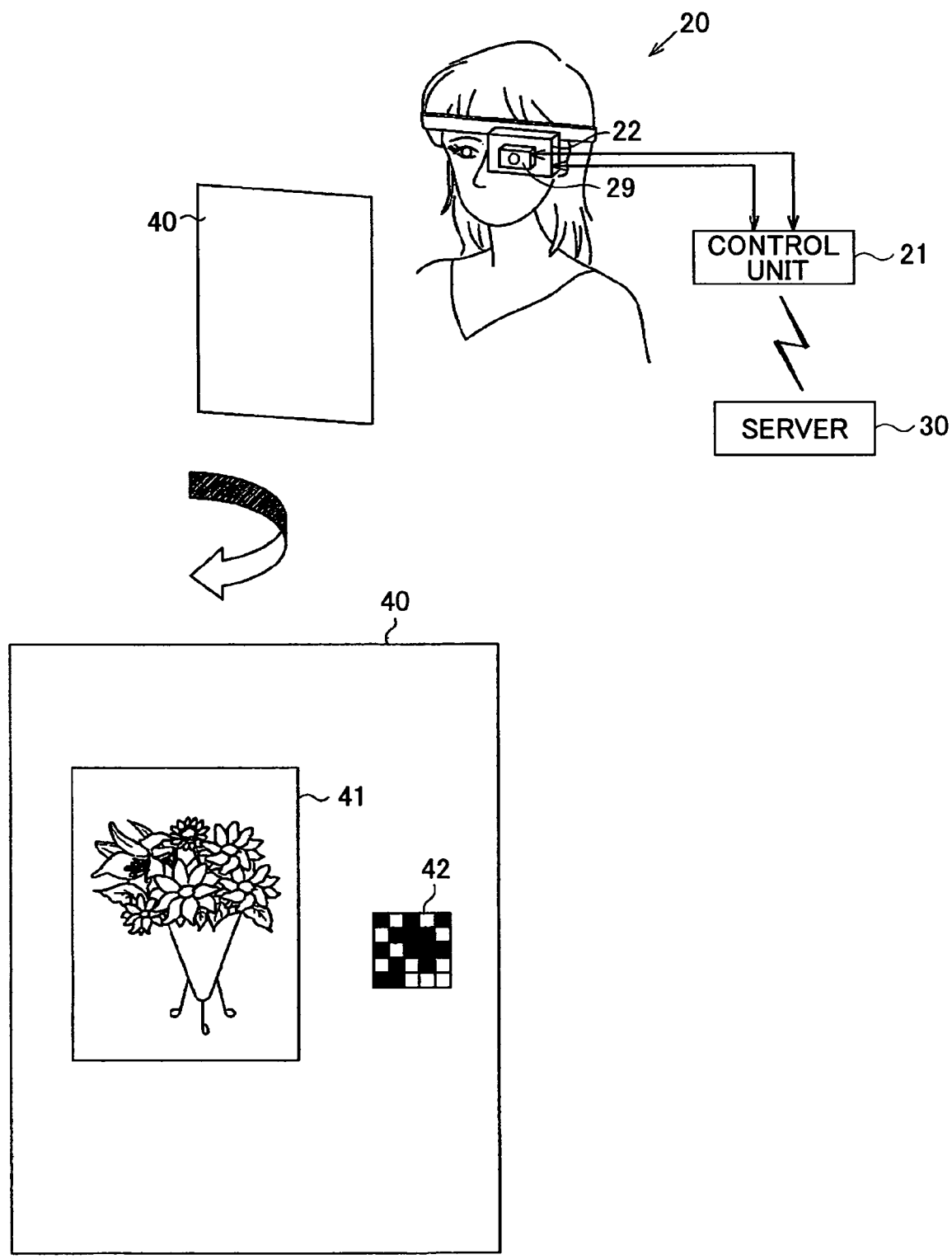
FIG. 2 is a schematic diagram for describing an operation of a head mount display.

The stereoscopic image data storage unit 31 stores stereoscopic image data 310. When an image for stereoscopic viewing is specified, the stereoscopic image data 310 are generated and recorded on the paper 40 (FIG. 2). The stereoscopic image data 310 include data about identification information, a stereoscopic image (right), and a stereoscopic image (left).

Data for specifying a stereoscopic image are recorded in an identification information data area. The identification information is included in the 2-dimensional code 42 (refer to FIG. 2) printed on the paper 40.

Data of a stereoscopic image that is displayed when the HMD 20 is worn by the right eye are stored in a stereoscopic image data area (right). Such data are used for stereoscopic viewing when the printed stereoscopic image 41 is viewed by the left eye, which in this example does not wear the HMD. In this way, stereoscopic viewing is made possible. In other words, when the HMD 20 is worn by the right eye, the viewing person sees the stereoscopic image displayed on the display unit 22 of the HMD 20 with the right eye, while seeing the stereoscopic image 41 (FIG. 2) on the paper 40 with the left eye. In this way, stereoscopic viewing is made possible.

Similarly, stereoscopic image data that are displayed when the HMD 20 is worn by the left eye are stored in a stereoscopic image data area (left). In such case, the printed stereoscopic image 41 is viewed by the right eye, and stereoscopic viewing is made possible. In other words, when the HMD 20 is worn by the left eye, the viewing person sees the stereoscopic image displayed on the display unit 22 of the HMD 20 with the left eye, while seeing the stereoscopic image 41 (FIG. 2) on the paper 40 with the right eye. In this way, stereoscopic viewing is made possible.

The viewing person wears the HMD 20 such that the display unit 22 is located in front of one of the eyes, as shown in FIG. 2, and sees the stereoscopic image 41 on the paper 40 with the other eye. Here, on the paper 40, the stereoscopic image 41 and the 2-dimensional code 42 are printed.

Next, descriptions about a method of stereoscopic viewing, i.e., the images to be seen by the left eye and the right eye, according to the present embodiment follow with reference to FIG. 3. An actual relative position 45 is shown in FIG. 3, wherein a viewing target is an apple and an orange placed on a table, and the viewing person stands on the right-hand side of the due front of the table. In this case, an image that the viewing person sees by the left eye is shown by a left eye image 46, and an image seen by the right eye is shown by a right eye image 47. Here, the parallax of the image between the left and the right eyes changes with the distance to the viewing target.

According to the present embodiment, stereoscopic viewing is provided by seeing the stereoscopic image 41 on the paper 40 by one eye, and seeing the image displayed on the display unit 22 of the HMD 20 by the other eye. For example, if the HMD 20 is worn for the left eye, the right eye sees the right eye image 47 serving as the stereoscopic image 41 on the paper 40, and the left eye sees the left eye image 46 displayed on the display unit 22 of the HMD 20.

Figure 4:
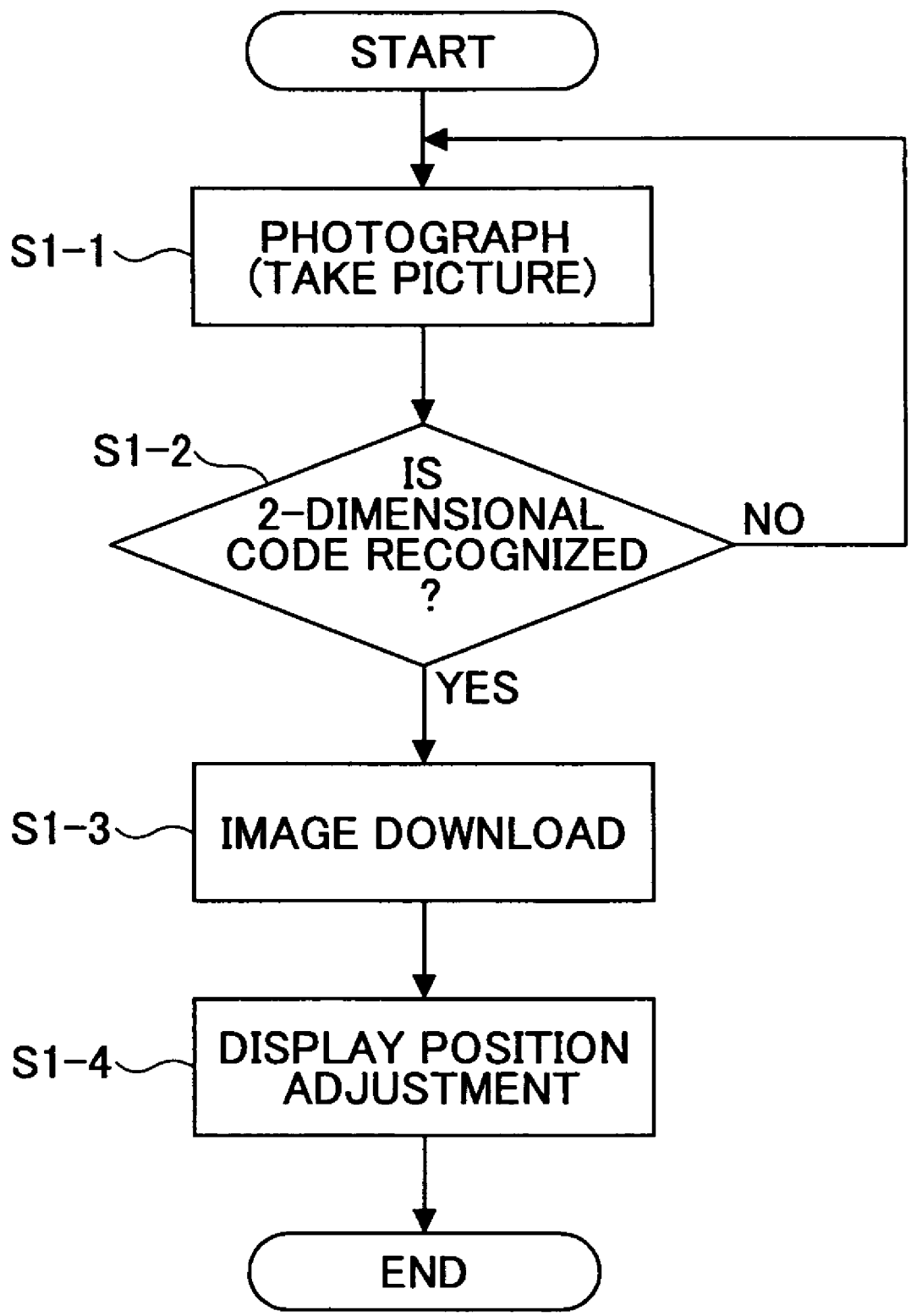
FIG. 4 is a flowchart of a process according to the first embodiment.
Figure 5:
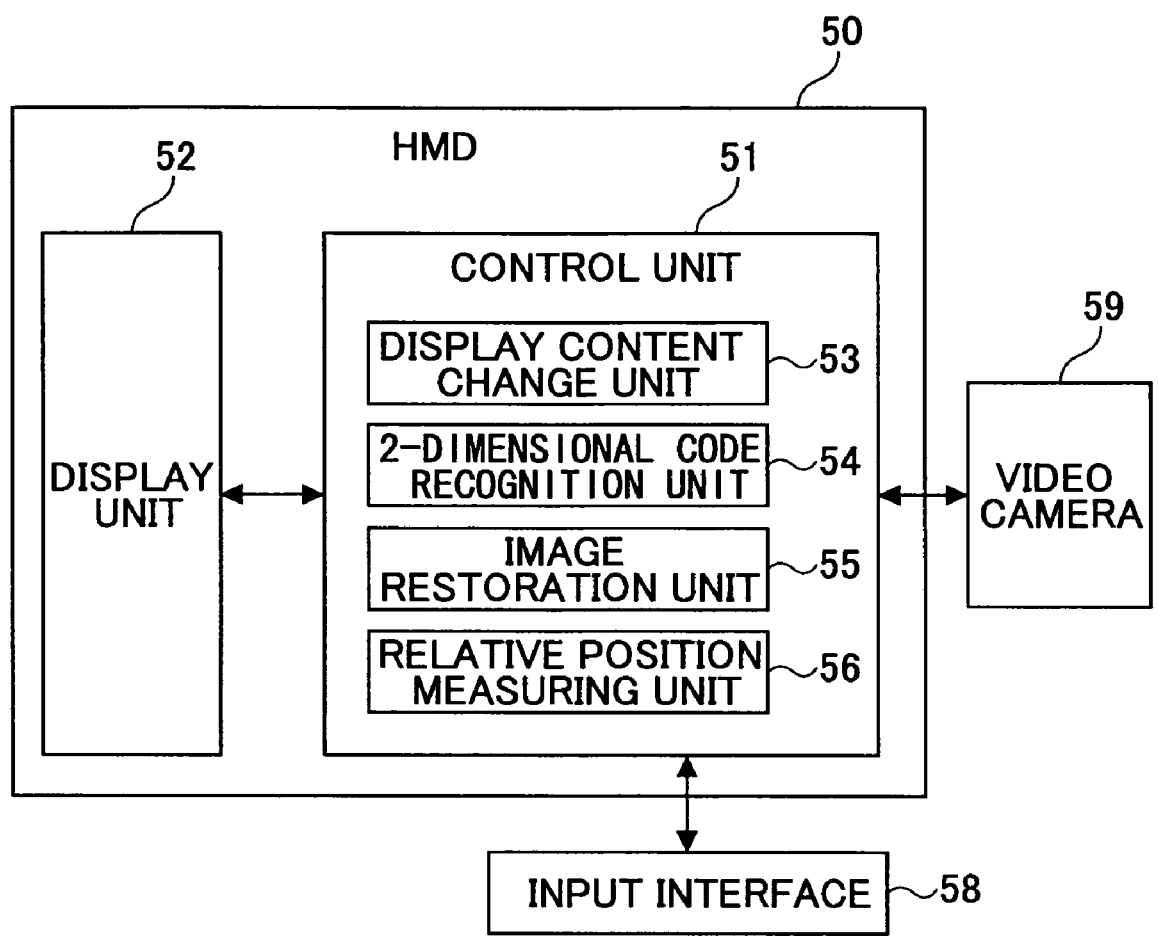
FIG. 5 is a block diagram of the image display system according to a second embodiment of the present invention.
Figure 6:
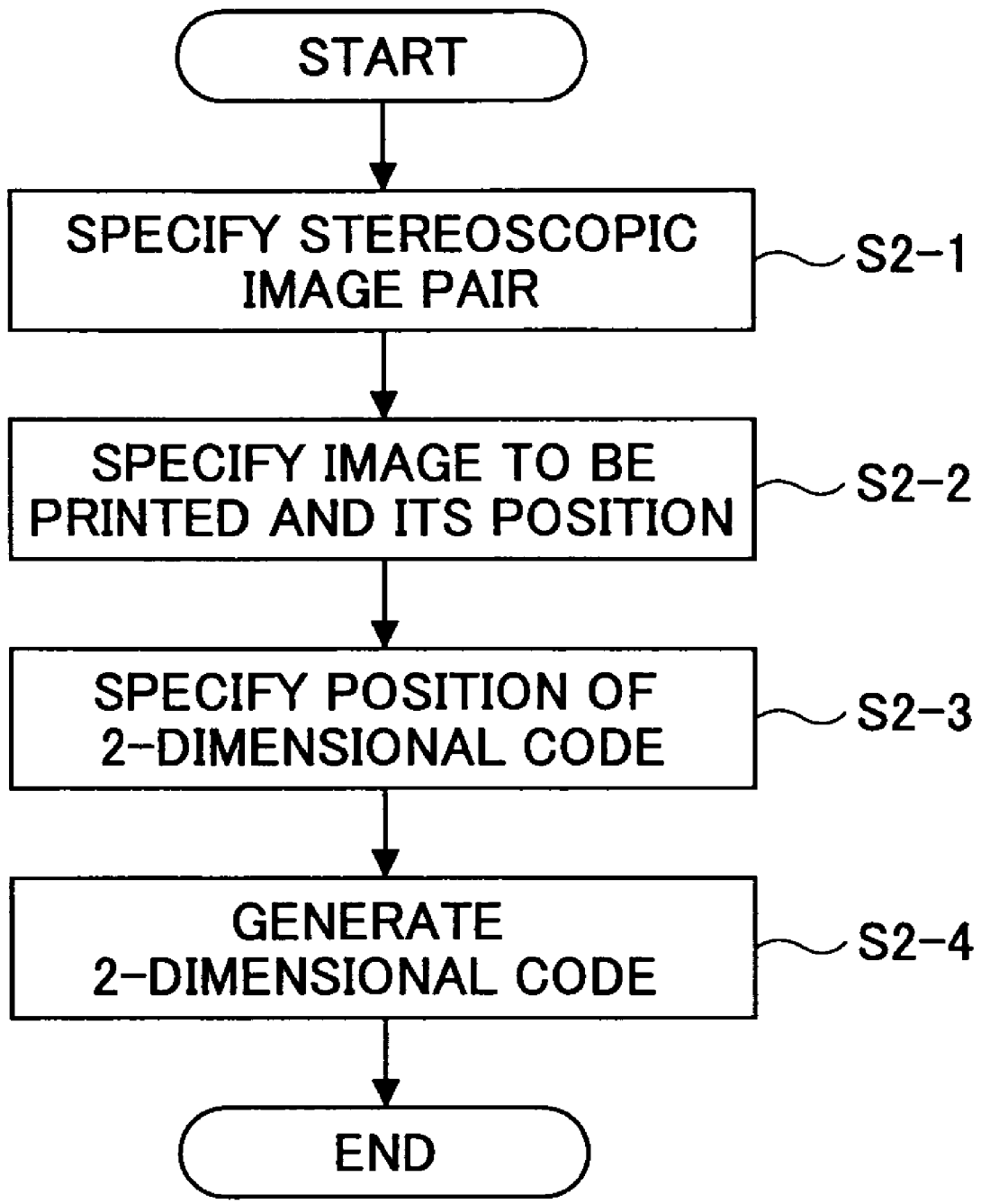
FIG. 6 is a flowchart of a process according to the second embodiment.

An exemplary process of performing a stereoscopic viewing using the image display system is described with reference to FIG. 4.

First, the stereoscopic image 41, and the 2-dimensional code 42, which contains the identification information, are printed on the paper 40. The viewing person wears the HMD 20 for one of his/her eyes. Whether the HMD 20 is worn for the right eye or for the left eye is input to the input interface 28, which information is stored in a storage unit (not illustrated) of the control unit 21. For example, if the HMD 20 is worn for the left eye, "left" is input, and the control unit 21 stores information indicating that the wearing position is "left".

Then, the paper 40 is photographed with the camera 29, while the viewing person looks at the paper 40 at the front as shown in FIG. 2 (Step S1-1). The 2-dimensional code recognition unit 24 of the control unit 21 reads the 2-dimensional code 42 in the photographed image (Step S1-2). Here, if the 2-dimensional code 42 is not recognized, the process returns to Step S1-1.

Then, the 2-dimensional code recognition unit 24 extracts the identification information from the 2-dimensional code 42, and provides the identification information to the image downloading unit 25; then, the image downloading unit 25 downloads a stereoscopic image specified by the identification information from the server 30 (Step S1-3). More specifically, the image downloading unit 25 transmits the identification information read from the 2-dimensional code 42, and the information about the wearing position, whether "left" or "right", to the server 30. That is, if the information indicating the wearing position is "left", that information is provided to the server 30 with the identification information. The server 30 identifies stereoscopic image data 310 based on the identification information, and the wearing position based on the information indicating the wearing position. Then, one of a stereoscopic image (right) and a stereoscopic image (left) is provided to the HMD 20 according to the wearing position, whether left or right. In the case of the present example, the stereoscopic image (left) is transmitted, and the display unit 22 of the HMD 20 shows the stereoscopic image (left).

Then, the viewing person performs a display position adjustment of the image being displayed on the HMD 20 (Step S1-4). More specifically, the viewing person operates the input interface 28 for carrying out projective transformation on the image being displayed on the display unit 22 such that positions of the stereoscopic image 41 on the paper 40 and the image on the display unit 22 agree. In this way, the stereoscopic view is obtained.

According to an embodiment of the present invention, the following effects are obtained.

(1) The first and the second view images are prepared taking parallax into consideration. More specifically, the first view image is the stereoscopic image 41, which is a real image, printed on the paper 40 for one of the eyes to view; and the second view image is a virtual image displayed by the HMD 20 for the other eye to view. In this way, stereoscopic viewing is provided. Accordingly, the eye that looks at the real image is not covered by the HMD 20, and the viewing person can keep awareness of the external world, and, for example, he/she can perform operations, and can perceive when a person is nearby, while performing stereoscopic viewing. Further, since the position of the image on the display unit 22 of the HMD 20 can be adjusted to agree with the position of the stereoscopic image 41 on the paper 40, stereoscopic viewing that is flexible can be provided. In this way, flexible stereoscopic viewing, while keeping awareness to the external world by one of the eyes, is provided.

(2) The HMD 20 displays the image, which is a virtual image, by the display unit 22 based on the image photographed with the camera 29. Stereoscopic viewing can be carried out using the 2-dimensional image, which is a virtual image, displayed based on the stereoscopic image 41 photographed with the camera 29.

(3) The HMD 20 reads the image of the 2-dimensional code 42 printed on the paper 40, the 2-dimensional code indicating an address, such as a URL, of the image of the virtual image, and displays the virtual image identified by the 2-dimensional code 42. In this way, stereoscopic viewing is realized by using the data of the virtual image beforehand prepared, mitigating a processing load.

(4) The HMD 20 for displaying the virtual image is a head wearing type single eye display unit; for this reason, both hands of the viewing person are free.

(5) The position of the virtual image displayed on the HMD 20 can be adjusted by carrying out projective transformation. In this way, stereoscopic viewing is provided by properly positioning the virtual image displayed on the HMD 20 to agree with the real image, i.e., the stereoscopic image 41 on the paper 40.

Second Embodiment

Hereafter, a second embodiment that realizes one or more aspects of the present invention is described with reference to FIGS. 5 through 11. An image display system, an image display method, a coding method, and a printed matter 65 for stereoscopic viewing, according to the second embodiment, are described, whereby a viewing person obtains flexible stereoscopic viewing with one of the eyes being available for seeing the external world. The printed matter 65 for stereoscopic viewing (typically, paper) carries an image (the first view image) that is a real image, and a 2-dimensional code for generating an image (the second view image) to be displayed on a head mounting display HMD 50. The first view image placed on the printed matter 65 for stereoscopic viewing is viewed by one of the eyes of the viewing person, while the second view image displayed on a display 52 of the HMD 50 is viewed by the other eye so that stereoscopic viewing is provided. Here, the second view image is generated by photographing the first view image and the 2-dimensional code on the printed matter 65; and by carrying out the following process. That is, the printed matter for stereoscopic viewing constitutes a real image presentation unit in this embodiment. Further, the HMD 50 (a single eye head mount display) constitutes a virtual image presentation unit.

The printed matter 65 (printed paper) (FIG. 7) is generated by a computer executing a printed matter generating program. Through execution of the program, an image to be printed is selected, contents of the 2-dimensional code are determined, and printing positions of one of a pair of stereoscopic images and the 2-dimensional code are determined.

Hereafter, a process of generating the printed matter 65 for stereoscopic viewing by the printed matter generating program is described. First, the printed matter generating program is started on a computer. Then, an image to be printed is selected. More specifically, the viewing person chooses a pair of stereoscopic images following directions displayed on the computer (Step S2-1). The pair of stereoscopic images, which images are beforehand stored in the computer, includes a stereoscopic image for the right eye, and a stereoscopic image for the left eye.

Next, the viewing person specifies a stereoscopic image to be printed, i.e., whether the stereoscopic image for the right eye or for the left eye is to be printed is selected; and the viewing person specifies a printing position (Step S2-2). More specifically, if the viewing person chooses to wear the HMD 50 for his/her right eye, the stereoscopic image for the left eye is to be printed. Further, the viewing person specifies the printing position of an image area 61 for the selected image in a printing area 60 displayed on the computer (FIG. 7). For example, as shown in FIG. 7, the position of the image area 61 is specified in the printing area 60.

Then, a position of a 2-dimensional code area 62 for printing the 2-dimensional code is specified (Step S2-3). More specifically, the viewing person specifies the position of the 2-dimensional code area 62 following directions displayed on the computer. Here, according to the present embodiment, the 2-dimensional code area 62 is a square, which area should not be overlapped with the image area 61. For example, the position of the 2-dimensional code area 62 is specified as shown in FIG. 7.

If the position of the 2-dimensional code area 62 is specified, the computer generates the 2-dimensional code (Step S2-4) as described in detail in the following.

First, ratios of lengths of sides of the 2-dimensional code area 62 and the image area 61 are determined. In the present example, the lengths of the sides of the image area 61 are 4 times as great as the lengths of the sides of the 2-dimensional code area 62.

Next, a position relation between the image area 61 and the 2-dimensional code area 62 is determined. In this example, the position relation is defined by a relative position of the lower left corner of the 2-dimensional code area 62 to the lower right corner of the image area 61 as indicated by an arrow in FIG. 7. For example, the relative position of the former can be expressed by (1, 1), where "1", serving as a unit length, represents the length of the side of the 2-dimensional code area. Then, with reference to FIG. 8, differences between a stereoscopic image 70 (for the left eye in this example) printed in the image area 61 and a stereoscopic image 71 (for the right eye) that is not printed in the image area 61 are computed to generate a difference image 72. Here, the stereoscopic image 70 represents the whole image printed in the image area 61, and the stereoscopic images 70 and 71 are constituted by 16 pixels (4 lines×4 columns). That is, a very coarse image is assumed for describing purposes.

The stereoscopic image 70 and the stereoscopic image 71 are expressed as 16-bit images in FIG. 8. Differences between corresponding pixels of the stereoscopic image 70 and the stereoscopic image 71 are given by the difference image 72. A numeric sequence is generated based on pixel values of the difference image 72; namely, a sequence (0, −1, 1, 0, −1, 0, −1, −2, 2, 4, 5, 4, 0, −1, 0, −1) is generated.

The information including the ratios of the lengths of the sides of the 2-dimensional code, the relative position, the difference information (coded information of the differences) described above is coded into the 2-dimensional code, and a 2-dimensional code image is generated. In the case of the present example, the 2-dimensional code image includes information (4, 4, 1, 1, 0, −1, 1, 0, −1, 0, −1, −2, 2, 4, 5, 4, 0, −1, 0, −1), the first two numbers representing the ratios, the next two numbers representing the relative position, and the rest representing the difference image 72. The 2-dimensional code image is printed at the 2-dimensional code area 62. Here, when the number of elements to be coded is great, because finer resolution and gradation of an image are required, data compression may be carried out using for example a Huffman encoding method and a box coding (a 2-dimensional coding) of Longsalt Systems.

When the above process is completed, the viewing person inputs printing directions to the computer such that an image that is similar to the image in the printing area 60 is printed on the paper 65 by a printing machine.

Next, a process of performing stereoscopic viewing using the paper 65 is described. First, the configuration of the image display system according to the second embodiment is described with reference to FIG. 5.

The head mount display HMD 50 for a single eye includes a control unit 51 that is connected to the display 52. The control unit 51 includes CPU, RAM, and ROM (not illustrated), and carries out steps described below. The control unit 51 includes a display content change unit 53, a 2-dimensional code recognition unit 54, an image restoration unit 55, and a relative position measuring unit 56, all of which carry out assigned functions by executing a program.

The display content change unit 53 adjusts the image displayed on the display 52 by performing projective transformation on display data of the image based on the relative position between the HMD 50 and the paper 65. Further, the display content change unit 53 performs the projective transformation on the display data of the image displayed on the display 52 according to an operation by the viewing person of an input interface 58, the viewing person selecting a state of the display data. Further, the display content change unit 53 automatically performs the projective transformation on the display data based on an amount of adjustment selected by the viewing person and the relative position of the HMD 50 to the paper 65.

The 2-dimensional code recognition unit 54 determines whether there is a 2-dimensional code present in the image that is photographed with the video camera 59. If the determination is affirmative, the 2-dimensional code recognition unit 54 decodes the 2-dimensional code. The image restoration unit 55 restores another stereoscopic image based on the difference image information that is decoded and the stereoscopic image photographed with the video camera 59.

The relative position measuring unit 56 determines the relative position (such as distance, direction, and inclination) between the HMD 50 and the paper 65 based on the 2-dimensional code 67 photographed with the video camera 59. That is, the relative position is acquired using the 2-dimensional code 67, the video camera 59, and the relative position measuring unit 56.

The display 52 is for displaying information processed and output by the control unit 51.

Further, the control unit 51 is connected to the video camera 59 serving as an image pick-up unit. The video camera 59 continuously takes images of the paper 65 (FIG. 7) through a lens. The video camera 59 is arranged such that the photographing plane is parallel to the display 52, and the center of the optical axis agrees with the center of the display 52. The image photographed with the video camera 59 is transmitted to the control unit 51.

Further, the control unit 51 is connected to the input interface 58. The input interface 58 includes a pointing device, such as a mouse, for adjusting the image being displayed on the display 52.

Figure 9:
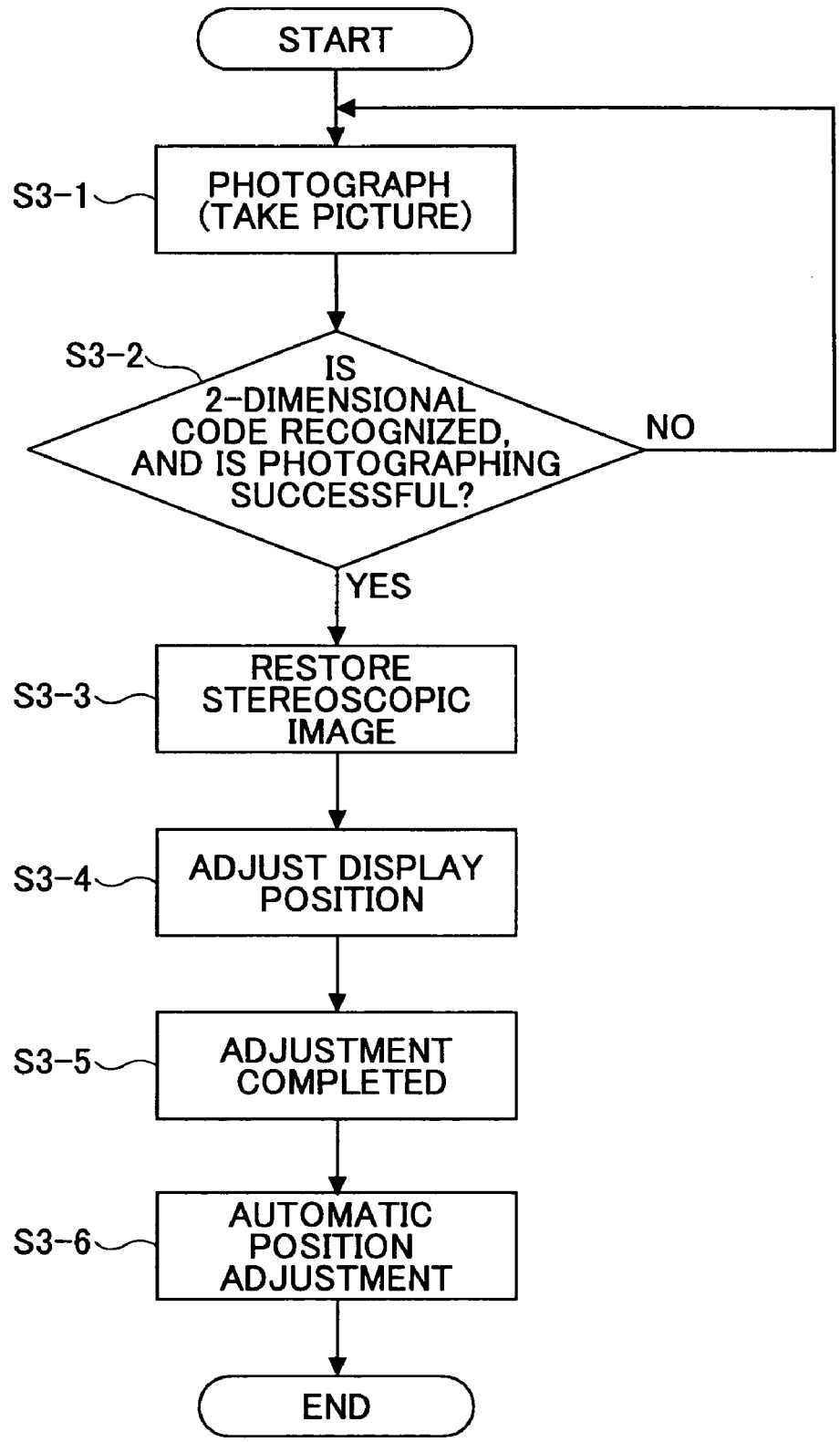
FIG. 9 is a flowchart of a process according to the second embodiment.
Figure 10:
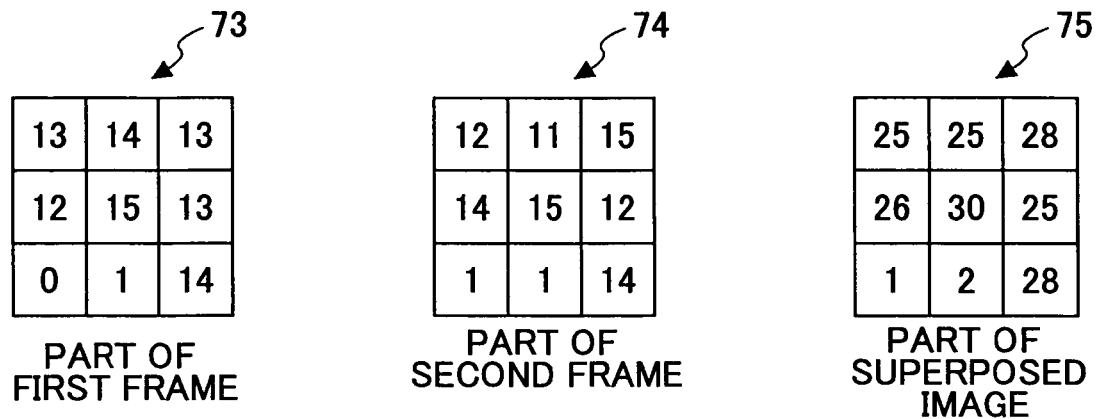
FIG. 10 gives data maps showing a superposed image obtained from a first frame and a second frame.
Figure 11:
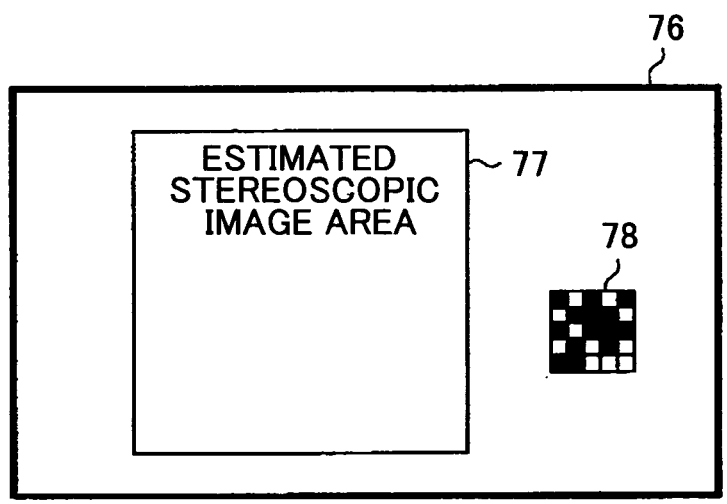
FIG. 11 is a schematic diagram showing a position of the superposed image.

The following description is about an exemplary process of performing stereoscopic viewing using the image display system, wherein FIGS. 9 through 11 are referenced.

The viewing person wears the HMD 50 like the case of the first embodiment, and faces the paper 65. Then, the video camera 59 takes a stereoscopic image 66 and the 2-dimensional code 67 printed on the paper 65 (Step S3-1). The video camera 59 transmits the photographed video image to the control unit 51. The 2-dimensional code recognition unit 54 of the control unit 51 recognizes the video image (Step S3-2).

Here, the process carried out by the 2-dimensional code recognition unit 54 is described.

The 2-dimensional code recognition unit 54 decodes the 2-dimensional code and recognizes the stereoscopic image 66. More specifically, the perimeter of the 2-dimensional code 67 is first recognized from the image in every frame photographed with the video camera 59, and tilt is compensated for. According to the present embodiment, the 2-dimensional code 67 is shaped square; therefore, the tilt can be easily compensated for by recognizing four angles of the 2-dimensional code. Then, the image, for which the tilt has been compensated for is superposed on a tilt compensated superposed image 76 (FIG. 11).

The tilt compensated superposed image 76 is described with reference to examples given in FIG. 10, which drawing shows a part of a first frame 73, a part of a second frame 74, and a part of a superposed image 75. The part of the first frame 73 is the part of the image of the first frame photographed with the video camera 59, to which image, the tilt compensation has been carried out. The part of the second frame 74 is the part of the image of the second frame photographed with the video camera 59, to which image, the tilt compensation has been carried out. The part of the superposed image 75 is the part of the tilt compensated superposed image based on the image of the first frame and the image of the second frame. That is, each pixel of the tilt compensated superposed image represents a total of values of the pixels of the first through the k-th frames.

Next, 2-dimensional code recognition is performed using the tilt compensated superposed image 76. A portion wherein the 2-dimensional code 78 is present in the tilt compensated superposed image 76 is binarized, and the 2-dimensional code is extracted. Then, the 2-dimensional code is decoded, and 2-dimensional code information is acquired. According to the example above, the 2-dimensional code information, which is a numerical sequence of (4, 4, 1, 1, 0, −1, 1, 0, −1, 0, −1, −2, 2, 4, 5, 4, 0, −1, 0, −1) is acquired. If one of or both the recognition of the 2-dimensional code 67 and photographing of the image is not properly performed (NO at Step S3-2), the process returns to Step S3-1.

If the 2-dimensional code 67 is successfully recognized and a video image is successfully photographed ("YES" at Step S3-2), the stereoscopic image is restored (Step S3-3). More specifically, an estimated stereoscopic image area 77 is first obtained from the 2-dimensional code information. Here, the values of the first, the second, the third, and the fourth elements of the 2-dimensional code information provide the ratio of the lengths of the sides of the 2-dimensional code, and the relative position. Accordingly, the estimated stereoscopic image area 77 relative to the position of the 2-dimensional code (a 2-dimensional code area 78) can be determined.

Subsequent elements of the 2-dimensional code information, namely, the fifth, the sixth, and so on to the k-th elements, are the difference information.

According to the above example, the 2-dimensional code includes the first to the 20th elements, wherein the difference information is comprised by 16 elements, namely, from the fifth to the 20th elements. Further, because the first and the second elements are (4, 4), the 16 elements are determined to configure a matrix of four lines×four sequences.

In another example, the first and the second elements of the 2-dimensional code information are (4, 3), and 12 elements from the fifth to the 16th elements may be provided. Then, the 12 elements are determined to constitute a matrix of 4×3. Further, in another example, the first and the second elements of the 2-dimensional code information are (8, 6), and 48 elements (from the fifth to the 52nd elements) may be provided. The 48 elements represent the difference information of an 8×6 matrix. That is, the numerical sequence (the 2-dimensional code information) is a single-dimensional expression of the matrix.

Referring again to the first example, wherein the numerical sequence is a single-dimensional expression of a 4×4 matrix, the 2-dimensional code information is converted into the 4×4 matrix, and the difference image 72 is restored. Further, the estimated stereoscopic image area 77 is divided into a 4×4 matrix. Then, the difference image 72 is added to the stereoscopic image 70 provided in the estimated stereoscopic image area 77, the added result being the stereoscopic image 71.

Then, projective transformation is carried out on the stereoscopic image 71 according to the relative position between the paper 65 and HMD 50. More specifically, the four corners of the 2-dimensional code photographed with the video camera 59 are recognized, projective transformation is carried out on the 2-dimensional code 78 on the compensation superposed image 76 according to this to agree with the recognized four corners, and projective transformation is similarly carried out on the stereoscopic image 71 in the estimated stereoscopic image area 77 of the compensation superposed image 76. Then, the stereoscopic image 71, on which the projective transformation has been carried out, is displayed on the display 52 of the HMD 50. Here, if an amount of adjustment at the time of the completion of adjustment (described below) is stored in a storage unit (not illustrated) in the display content change unit 53 of the HMD 50, the display content change unit 53 carries out projective transformation on the stereoscopic image 71 using the amount of adjustment, and displays the image after adjustment on the display 52.

Further, if necessary or desired, the viewing person can adjust the display position (Step S3-4). More specifically, the viewing person inputs a direction concerning the projective transformation of the image being displayed on the display 52 using the input interface 58. According to the direction, the display content change unit 53 carries out projective transformation on the image being displayed on the display 52. When the position adjustment of the image is completed, that is, if stereoscopic viewing is obtained, the viewing person inputs a direction that the adjustment is completed to the input interface 58 (Step S3-5). The control unit 51 of the HMD 50 stores the amount of adjustment at the time of the completion of the adjustment in the storage unit (not illustrated) of the display content change unit 53. In addition, the amount of tilt is measured by the 2-dimensional code recognition unit 54 in the meantime.

The relative position (position and inclination) between the paper 65 and the HMD 50 is specified by measuring the amount of tilt, and based on the relative position (position and inclination) of the HMD 50 to the paper 65 at the time of the completion of adjustment, wherein the distance between the paper 65 and HMD 50 when the adjustment is completed is made into 1 (serves as the reference). Then, based on the relative position (position and inclination) of the HMD 50 to the paper 65 at the time of the completion of adjustment, the display content change unit 53 of HMD 50 automatically adjusts the display position, and the like, of the image (Step S3-6). In this way, henceforth, the viewing person can view a stereoscopic image without having to adjust the display position, and the like.

According to an embodiment of the invention, the following effects are obtained in addition to one or more of the effects described above.

(6) The HMD 50 displays the virtual image that is generated by adding the real image and the 2-dimensional code 67 that contains the data representing differences from the stereoscopic image 66 on the paper 65 photographed with the video camera 59, i.e., the differences between the images for the right and left eyes. In this way, the data for showing the virtual image is not beforehand required, but the virtual image can be generated using the photographed image.

(7) The 2-dimensional code 67 includes the coded data about the differences between the images viewed by the two eyes, and the coded data about the relative position and relative size of the 2-dimensional code 67 to the stereoscopic image 66 shown as the real image. Accordingly, the information about the relative position and relative size of the 2-dimensional code 67 to the stereoscopic image 66 shown as the real image, and the difference data can be acquired from the 2-dimensional code 67. In this way, the image to be displayed by the HMD 50 can be generated from the stereoscopic image 66 that is photographed, and the 2-dimensional code 67.

(8) The relative position of the HMD 50 to the paper 65 is determined by the 2-dimensional code 67, the video camera 59, and the relative position measuring unit 56. In this way, the virtual image can be displayed using the determined relative position.

(9) The relative position can be determined using the image that is photographed with the video camera 59 of the HMD 50.

(10) The projective transformation based on the determined relative position is carried out on the display data of the image shown by the HMD 50. In this way, the image (virtual image) displayed on the HMD 50 is adjusted according to the relative position between the paper 65 and the HMD 50.

(11) By an operation of the viewing person, the projective transformation can be carried out on the display data of the image (the second view image) on which the projective transformation based on the relative position has been carried out, the viewing person selecting a state of the display data. In this way, the virtual image displayed on the HMD 50 can be adjusted by the operation of the viewing person according to an individual difference, such as an angle, due to a personal physical feature.

(12) The projective transformation is carried out on the display data of the image (the second view image) displayed on the HMD 50 based on the information (the amount of adjustment) according to the viewing person's selection, and based on the relative position. That is, the projective transformation is carried out considering the individual difference, such as the congestion angle, due to the personal physical feature, and the relative position. At the same time, the image (the second view image) displayed on the HMD 50 can be automatically adjusted to agree with the stereoscopic image 66 (real image) on the paper 65 such that stereoscopic viewing is possible according to the relative position.

(13) The 2-dimensional code 67 includes the information about the relative position and relative size of the stereoscopic image 66 and the 2-dimensional code 67 that is provided on the paper 65 with the stereoscopic image 66. Accordingly, the position and size of the stereoscopic image 66 can be determined by reading the information included in the 2-dimensional code 67.

Third Embodiment

Figure 12:
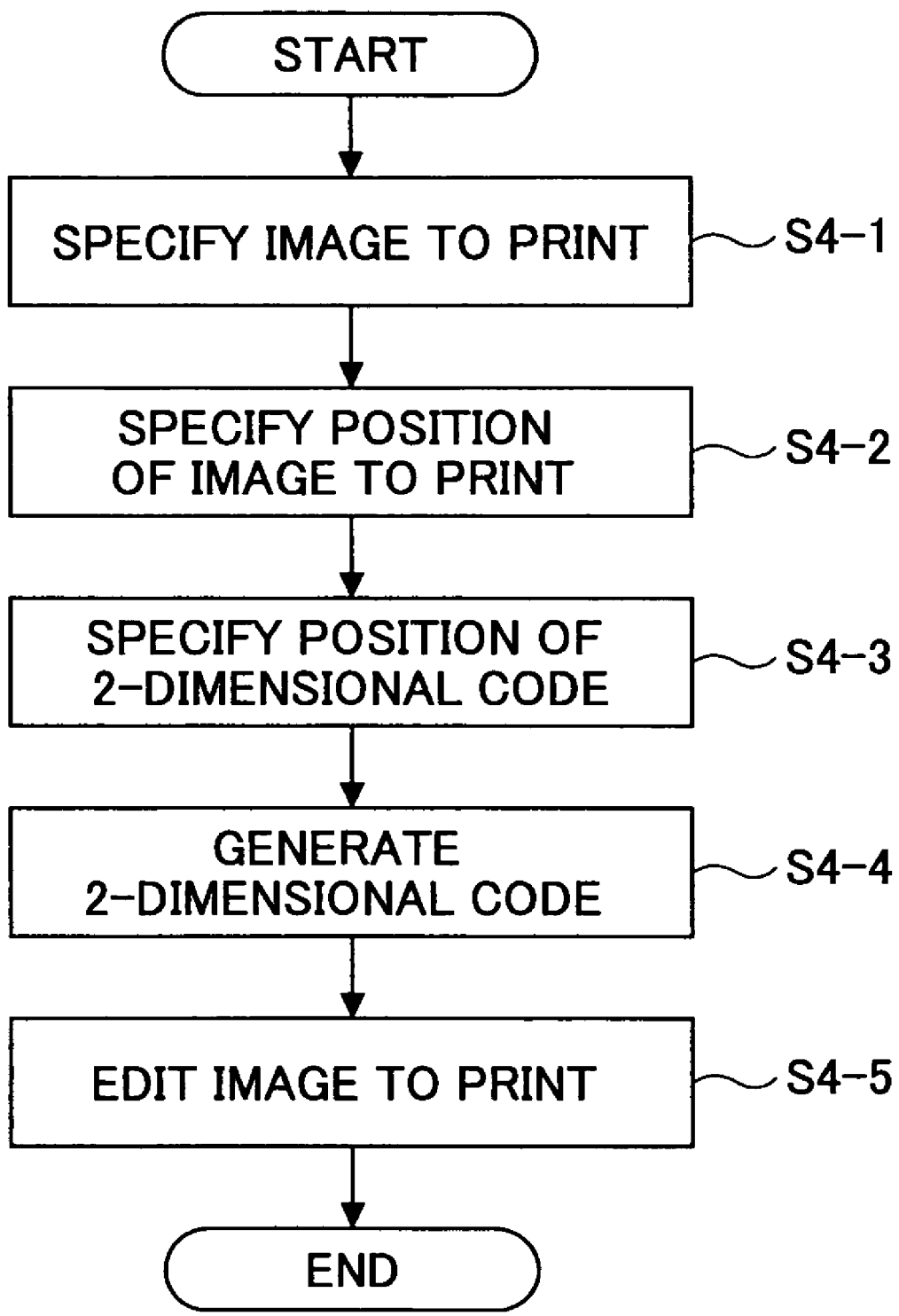
FIG. 12 is a flowchart of a process according to the third embodiment of the present invention.
Figure 14:
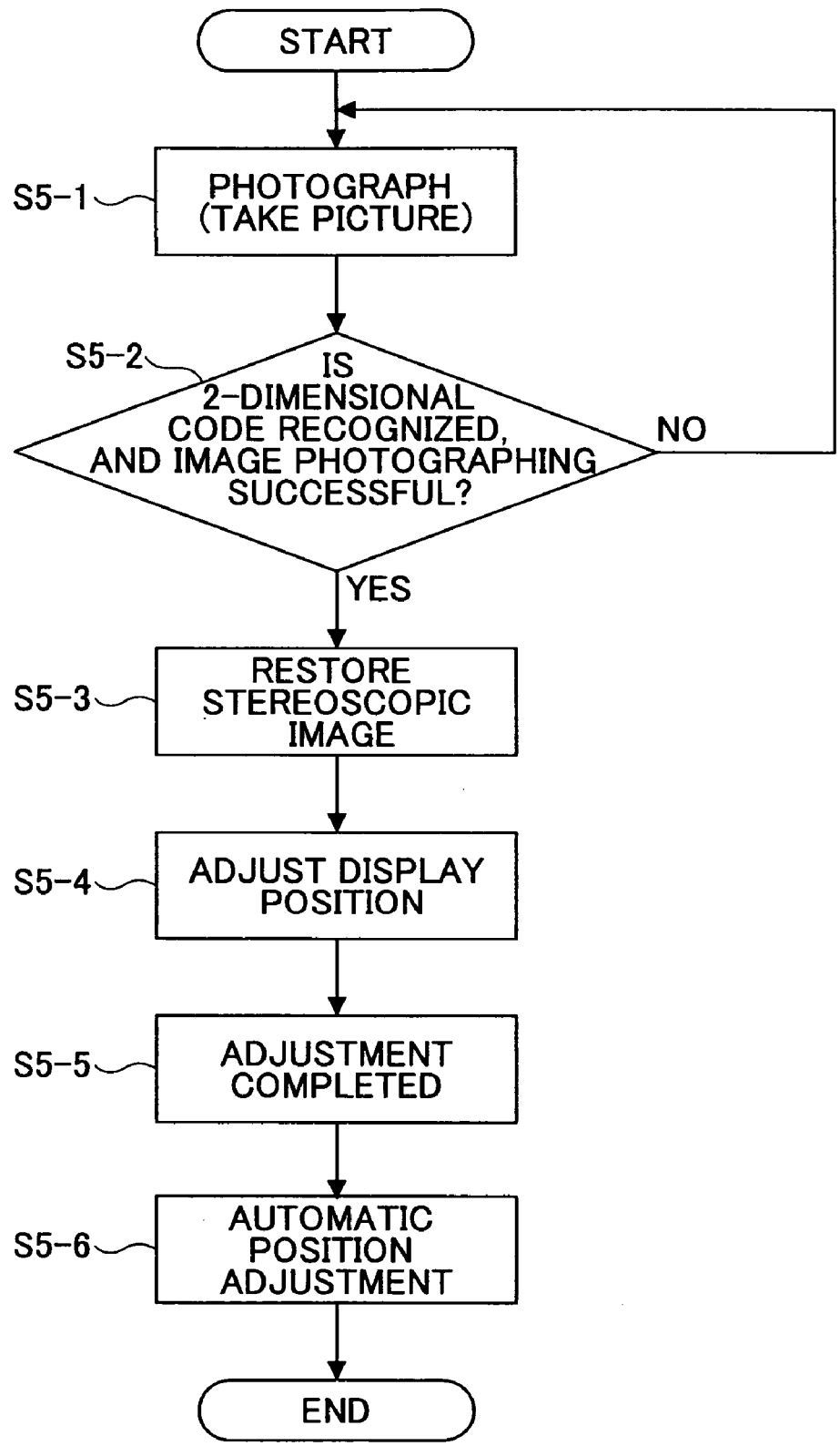
FIG. 14 is a flowchart of a process according to the third embodiment.

Hereafter, a third embodiment that realizes one or more aspects of the present invention is described with reference to FIGS. 12 through 14. Descriptions follow about an image display system, an image display method, a coding method, and a printed matter 85 for stereoscopic viewing according to the third embodiment, wherein the viewing person can perceive the external world with one of the two eyes. With this embodiment, a first view image and a 2-dimensional code are printed on the printed matter 85 (typically, paper 85), wherein the 2-dimensional code is for generating a second view image to be displayed on a single eye head mount display HMD 50 such that a part of the image is stereoscopically shown in a different depth position (i.e., 3-dimensionally with an elevation) using parallax. More specifically, the first view image on the printed matter 85 is viewed with one eye of the viewing person, and the second view image displayed on the display 52 of the HMD 50 is viewed by the other eye. Then, the part of the image is stereoscopically viewed with the different depth position. In other words, the part is seen with unevenness (an elevation). The printed matter for stereoscopic viewing serves as a real image presentation unit, and the single eye head mount display HMD 50 serves as a virtual image presentation unit. According to the third embodiment, a map is used as the image, a part of which is made visible with the different depth position (i.e., with an elevation); however, this is for example only, and the present invention can be applied to other objects.

First, the printed matter 85 is prepared as follows (refer to FIG. 13). The computer executes a second printed matter generating program for determining contents of the 2-dimensional code, the position of the selected image, the position of the portion of the image for stereoscopic display, and the position of the 2-dimensional code.

An exemplary process of preparing the printed matter 85 is described with reference to FIG. 12.

The second printed matter generating program is started at the computer, and then the viewing person specifies an image wherein an elevation is made to be visible (Step S4-1). Here, it is assumed that a map image shown in a stereoscopic image area 81 shown in FIG. 13 is specified. Next, a position of the image in the printing area is specified (Step S4-2). That is, the stereoscopic image area 81 is specified. Next, a position of the 2-dimensional code is specified (Step S4-3). That is, the viewing person specifies a 2-dimensional code area 82.

Next, the 2-dimensional code is generated (Step S4-4) as follows.

First, the viewing person specifies the position and size of the part that is to be stereoscopically shown in the stereoscopic image area 81. More specifically, according to the system of coordinates given in an upper part of FIG. 13, for example, a coordinate (8, 1) and a size 2 are input; a coordinate (8, 11) and a size 2 are input; and an appending message, e.g., "convenience stores", is input.

Then, the computer computes a ratio of lengths of the sides of the 2-dimensional code area 82 and the stereoscopic image area 81. In this example, the vertical length and the horizontal length of the stereoscopic image area 81 are 12 times as long as the vertical length and the horizontal length, respectively, of the 2-dimensional code area 82. Next, the relative position between the stereoscopic image area 81 and the 2-dimensional code area 82 is determined. More specifically, the relative position between the lower right corner of the stereoscopic image area 81 and the lower left corner of the 2-dimensional code area 82, as indicated by an arrow of a dotted line in FIG. 13, is measured. In this example, the relative position can be expressed by (10, 2), wherein the length of a side of the 2-dimensional code area serves as the unit length.

The above information, namely, the ratios of the vertical and horizontal lengths between the stereoscopic image area 81 and the 2-dimensional code, the relative position, and position code data (8, 1, 2, 8, 11, 2, convenience store) that are input by the viewing person are appended. As a result, the 2-dimensional code including (12, 12, 10, 2, 8, 1, 2, 8, 11, 2, convenience store) is generated. The 2-dimensional code is made into the 2-dimensional code image, and the image is transposed to the 2-dimensional code area 82. Here, if a great number of data elements have to be coded due to, e.g., the size of difference image being large and gradation of the image being required, data compression by the Huffman coding or the box coding (2-dimensional coding) of Longsalt Systems may be used.

If necessary or desired, the printing area is edited (Step S4-5). When a printing direction is issued, an image similar to the printing area 80 is printed by a printing machine, and the paper 85 is output. Here, the paper 85 as shown in FIG. 13 is printed. In the paper 85, a map image 86, a 2-dimensional code 87, and characters that may have been edited as desired, e.g., "convenience stores" are arranged.

Next, stereoscopic viewing using the paper 85 is described. Where the structure of the system according to the third embodiment is the same as the second embodiment, descriptions are not repeated.

Hereafter, an exemplary process of stereoscopic viewing is described with reference to FIG. 14.

First, the viewing person wears the HMD 50 as shown in FIG. 2 as in the first and the second embodiments above. Here, it is assumed that he/she wears the HMD 50 for the right eye, which fact is input to the input interface 58. The control unit 51 of the HMD 50 stores data indicating that the viewing person wears the HMD 50 for the "right" eye in the storage unit (not illustrated) of the control unit 51. Then, the viewing person views the paper 85; and the map image 86 and the 2-dimensional code 87 printed on the paper 85 are photographed by the video camera 59 (Step S5-1). Then, the 2-dimensional code recognition unit 54 of HMD 50 recognizes the photographed video image (Step S5-2) in the same way as in the second embodiment. In this way, according to the example, a restoration result (12, 12, 10, 2, 8, 1, 2, 8, 11, 2, convenience store) is obtained from the 2-dimensional code 87. In addition, if one of or both the recognition of the 2-dimensional code 87 and photographing of the video image is not properly performed ("NO" at Step S5-2), the process returns to step S5-1.

When the 2-dimensional code 87 can be recognized and photographing of the video image are properly performed ("YES" at Step S5-2), the stereoscopic image is restored (Step S5-3). More specifically, the map image area is first determined by the same method as determining the stereoscopic image area in the second embodiment. Then, a specific partial move image is generated to (8, 1) and (8, 11) of the determined map image area, the specific partial move image being an image having pixels shifted to the left by a predetermined quantity, for example, a magnitude of 2. Here, the direction of moving the portion that is to be shown with the elevation using parallax is determined based on the data stored as the wearing position. That is, in this example, "right" has been stored as the wearing position; accordingly, the image is moved to the left.

Then, projective transformation is carried out on the image to be displayed on the HMD 50 according to the relative position between the paper 85 and the HMD 50. More specifically, four corners of the 2-dimensional code photographed with the video camera 59 are recognized, projective transformation is carried out on the 2-dimensional code of the tilt compensation superposed image in accordance with this, and projective transformation is similarly carried out on the generated specific partial move image. Then, the specific partial move image, on which projective transformation has been carried out, is displayed on the display 52 of the HMD 50. Here, if an amount of adjustment at the time of the completion of the adjustment (described below) is stored in the storage unit (not illustrated) of the display content change unit 53 of the HMD 50, the display content change unit 53 is further adjusted by carrying out projective transformation on the specific partial move image using the amount of adjustment at the time of the completion of the adjustment, and an image after the adjustment is displayed on the display 52.

If necessary or desired, display position adjustment may be carried out by the viewing person (Step S5-4). When the viewing person obtains a position that provides stereoscopic viewing, a direction of completion of adjustment is input to the input interface 58 (Step S5-5). The control unit 51 of the HMD 50 stores the amount of the adjustment at the time of the completion of the adjustment in the storage unit (not illustrated) of the display content change unit 53. Here, an amount of tilt is measured by the 2-dimensional code recognition unit 54 in the meantime. By using the measured amount of tilt, the relative position (the position and inclination) between the paper 85 and the HMD 50 at the time of the completion of adjustment is specified, wherein the relative distance between the paper 85 and the HMD 50 at the time of the completion of adjustment is made into 1, serving as the reference value. Then, based on the relative position (the position and inclination) of HMD 50 at the time of the completion of adjustment, the display content change unit 53 of the HMD 50 automatically adjusts the display position of an image (Step S5-6). Here, the process of steps S5-4 through S5-6 is performed like the steps S3-4 through S3-6 of the second embodiment.

According to an embodiment of the invention, the following effects are obtained in addition to one or more of the effects described above.

(14) The 2-dimensional code 87 includes information about the position on the portion that is to be displayed with elevation in the map image 86 using parallax. Therein, the map image 86 and the 2-dimensional code 87 are photographed, and the position information on the portion that is to be displayed with elevation using the parallax in the map image 86 is acquired from the 2-dimensional code 87. In this way, the image to be displayed on the HMD 50 so that the part of the map image 86 can be viewed with elevation using parallax can be generated using the photographed image without beforehand preparing the data of the image for displaying on the HMD 50.

Fourth Embodiment

Figure 17:
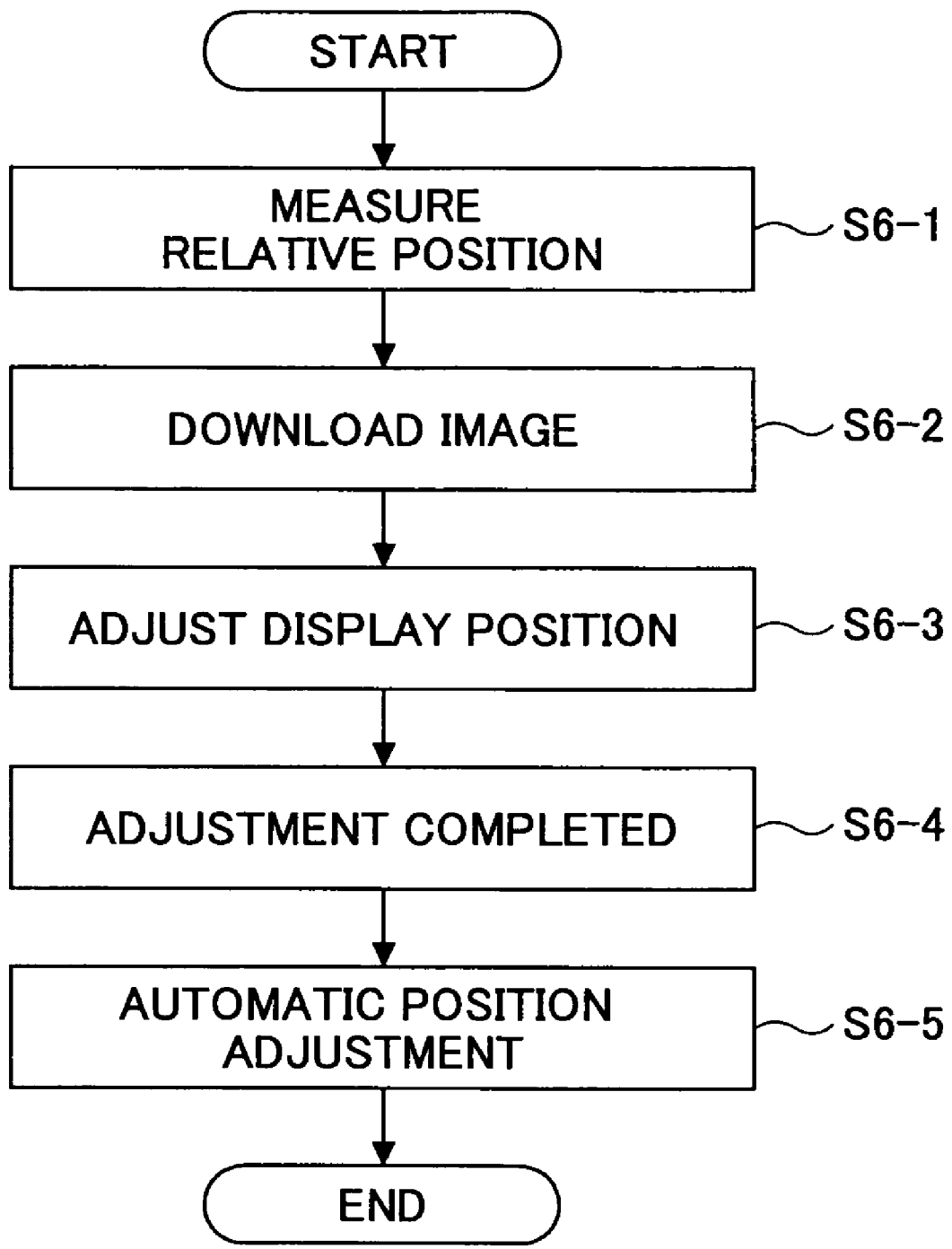
FIG. 17 is a flowchart of a process according to the fourth embodiment.

Hereafter, a fourth embodiment that realizes one or more aspects of the present invention is described with reference to FIGS. 15 through 17. In the following, an image display system and an image display method of flexible stereoscopic viewing are described, wherein the viewing person can view the external world with one of the two eyes. According to the fourth embodiment, stereoscopic viewing is available at multiple points with a first view image displayed on a multiaspect stereo display 100 that shows different images according to viewing positions, and a second view image displayed on the display of a single eye head mount display HMD 90. That is, the multiaspect stereo display constitutes a real image presentation unit, and the single eye head mount display constitutes a virtual image presentation unit.

Figure 15:
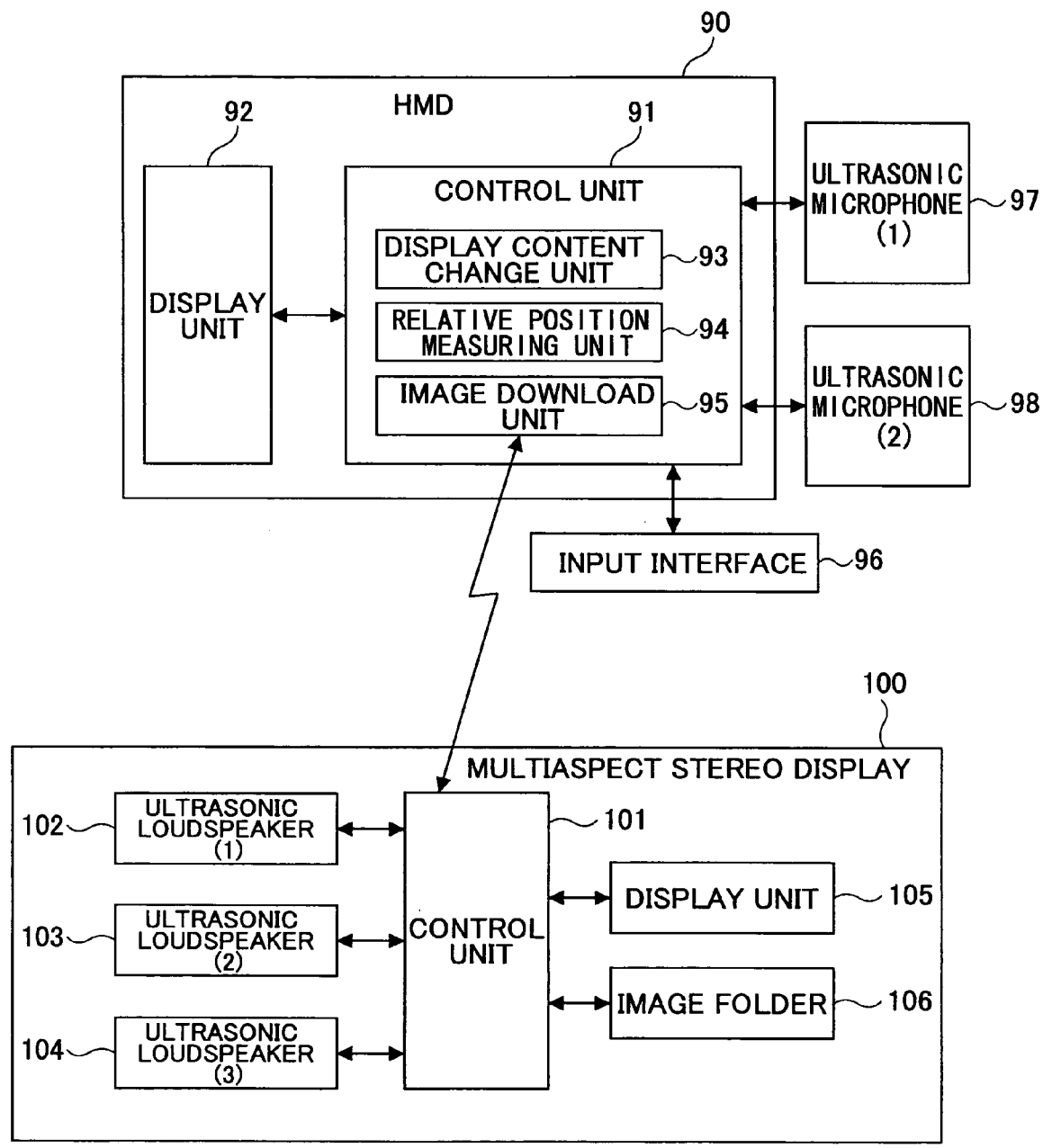
FIG. 15 is a block diagram of the image display system according to the fourth embodiment of the present invention.

As shown in FIG. 15, the single eye head mount display HMD 90 includes a control unit 91, and a display 92 connected to the control unit 91. The control unit 91 includes CPU, RAM, and ROM (not illustrated), and executes a process that is described below. The control unit 91 includes a display content change unit 93, a relative position measuring unit 94, and an image downloading unit 95, which function according to a program for the process.

The display content change unit 93 adjusts an image to be displayed on the display 92 by carrying out projective transformation on display data of the image. That is, the display content change unit 93 functions as a display data deformation unit for carrying out projective transformation to the display data of the image based on the relative position of the HMD 90 and the multiaspect stereo display 100. Further, the display content change unit 93 functions as a display data status selection unit for carrying out projective transformation on the image displayed on the display 92 by an operation of the viewing person, and prompting the viewing person to choose the state of the display data. Further, the display content change unit 93 functions as a display data automatic deformation unit for automatically carrying out projective transformation on display data based on the amount of adjustment by the viewing person's selection, and the relative position between the multiaspect stereo display 100 and the HMD 90.

The relative position measuring unit 94 determines the relative position (relative relation about distance, direction, and inclination) of the HMD 90 to the multiaspect stereo display 100 by receiving an ultrasonic wave transmitted by ultrasonic loudspeakers 102, 103, and 104 of the multiaspect stereo display 100 with ultrasonic microphones 97 and 98 attached to the HMD 90. That is, the ultrasonic loudspeakers 102, 103, and 104, the ultrasonic microphones 97 and 98, and the relative position measuring unit 94 function as a relative position specification unit.

The image downloading unit 95 downloads an image to be displayed on the HMD 90 from the multiaspect stereo display 100.

The display 92 displays information processed and output by the control unit 91.

Further, the ultrasonic microphones 97 and 98 attached to the HMD 90 are connected to the control unit 91. The ultrasonic microphones 97 and 98 receive ultrasonic waves transmitted by the ultrasonic loudspeakers 102, 103, and 104 of the multiaspect stereo display 100.

Further, the control unit 91 is connected to an input interface 96. The input interface 96 includes a pointing device, such as a mouse, for adjusting an image displayed on the display 92.

Here, the HMD 90 may be connected to the multiaspect stereo display 100 by a cable or radio. The multiaspect stereo display 100 includes a control unit 101 that is connected to the control unit 101, the ultrasonic loudspeakers 102, 103, and 104, the display 105, and an image folder 106.

The control unit 101 includes CPU, RAM, ROM, and a hard disk, which are not illustrated, and perform a process as described below.

The ultrasonic loudspeakers 102, 103, and 104 generate ultrasonic waves having different wavelengths. The ultrasonic loudspeaker 102 is located at a lower left corner of the front unit of the multiaspect stereo display 100 as shown in FIG. 16. The ultrasonic loudspeaker 103 is located at an upper left corner of the front unit of the multiaspect stereo display 100, and is located on the vertical line of the ultrasonic loudspeaker 102. The ultrasonic loudspeaker 104 is located at a lower right corner of the front unit of the multiaspect stereo display 100, and is located on the horizontal line of the ultrasonic loudspeaker 102.

The display 105 displays an image stored in the image folder 106. The image displayed by the display 105 of the multiaspect stereo display 100 is differently viewed by different positions of viewing persons. For example, as shown in FIG. 16, a first viewing person in a position A sees an image a1; a second viewing person in a position B sees an image b1; and a third viewing person in a position C sees an image c1. Further, the HMD 90 of the first viewing person shows an image a2; the HMD 90 of the second viewing person shows an image b2; and the HMD 90 of the third viewing person shows an image c2. Here, the images a1 and a2 constitute a stereoscopic image pair; the images b1 and b2 constitute a stereoscopic image pair; and the images c1 and c2 constitute a stereoscopic image pair. In this way, the viewing persons can see a 3-dimensional moving picture even though they are located at the different positions. More specifically, for example, in the case of the first viewing person, the image a1 displayed on the display 105 is viewed by one eye, and the image a2 displayed on the display 92 of the HMD 90 is viewed by the other eye. In addition, these images are stored in the image folder 106 of the multiaspect stereo display 100, taking a synchronization.

As in the first through the third embodiments, the viewing person wears the HMD 90 such that the display 92 can be viewed with one eye, and the multiaspect stereo display 100 is seen in this state with the other eye.

The process of viewing the 3-dimensional moving picture using the image display system constituted as described above is described with reference to FIG. 17.

First, the viewing person wears the HMD 90. The ultrasonic microphones 97 and 98 of the HMD 90 receive the ultrasonic waves of different frequencies transmitted by the ultrasonic loudspeakers 102, 103, and 104 of the multiaspect stereo display 100. Based on the received ultrasonic waves, the relative position measuring unit 94 acquires the relative position between the HMD 90 and each of the ultrasonic loudspeakers 102, 103, and 104 (Step S6-1).

Then, the HMD 90 downloads an image (Step S6-2). More specifically, HMD 90 first transmits data about the acquired relative position to the multiaspect stereo display 100. The multiaspect stereo display 100 distinguishes whether the position of the HMD 90 is in the position A, the position B, or the position C based on the relative position between the HMD 90 and each of the ultrasonic loudspeakers 102, 103, and 104. Then, a stereoscopic image in sync with the image that is displayed on the display 105 and can be viewed at the distinguished position is transmitted to the HMD 90 frame by frame. For example, if the viewing person is in the position A, he/she views the image a1 on the multiaspect stereo display 100; accordingly, the multiaspect stereo display 100 continuously transmits frames of the image a2 that is in sync with the image a1 and constitutes the stereoscopic image pair with the image a1 to the HMD 90 such that the image a2 is displayed on the display 92. In addition, the relative position is determined, and when the viewing person moves, e.g., to the position B from the position A, the multiaspect stereo display 100 changes the image to be transmitted from the image a2 to the image b2.

The HMD 90 determines the relative position (relation of distance, direction, and inclination) between the multiaspect stereo display 100 and the HMD 90 based on the ultrasonic waves received from the ultrasonic loudspeakers 102, 103, and 104, and carries out projective transformation on the image received based on this. Then, the image on which the projective transformation has been carried out is displayed on the display 92 of the HMD 90. Here, when the amount of adjustment at the time of the completion of adjustment as described below is stored in a storage unit (not illustrated) of the display content change unit 93 of the HMD 90, the display content change unit 93 may further carry out projective transformation on the image using the amount of adjustment at the time of the completion of adjustment, and such adjusted image is displayed on the display 92.

Further, if necessary or desired, the viewing person may adjust the display position (Step S6-3). More specifically, the viewing person inputs directions of projective transformation about the image being displayed on the display 92 using the input interface 96. Then, the display content change unit 93 carries out projective transformation on the image displayed on the display 92 according to the directions. Further, the viewing person inputs directions of the completion of adjustment to the input interface 96, if the image is in the position that gives stereoscopic viewing (Step S6-4). The control unit 91 of the HMD 90 stores the amount of adjustment at the time of the completion of adjustment in the storage (not illustrated) of the display content change unit 93.

Afterward, the relative position (the position and inclination) between the multiaspect stereo display 100 and the HMD 90 is determined with reference to the relative position of the HMD 90 at time of the completion of the adjustment, the reference relative position being normalized as 1.

Then, based on the relative position (the position and inclination) of the HMD 90 at the time of the completion of adjustment, the display content change unit 93 of the HMD 90 automatically adjusts the display position of the image (Step S6-5). In this way, the viewing person henceforth can see a stereoscopic image without having to adjust the display position, and the like.

According to an embodiment of the present invention, the following effects are obtained in addition to one or more of the effects described above.

(15) The relative position between the HMD 90 and the multiaspect stereo display 100 is determined by the ultrasonic loudspeakers 102, 103, and 104, the ultrasonic microphones 97 and 98, and the relative position measuring unit 94. In this manner, a virtual image can be shown using the determined relative position.

(16) The multiaspect stereo display 100 presents two or more images (such as the images a1, b1, and c1) corresponding to the positions of the viewing persons as a real image, and the HMD 90 presents the virtual image (such as the images a2, b2, and c2) corresponding to the real image shown on the multiaspect stereo display 100. In this way, simultaneous stereoscopic viewing is made possible at the different positions using the different real images and different virtual images according to the positions. For example, if two or more images (such as the images a1, b1, and c1) displayed on the multiaspect stereo display 100 are of the same object from different directions, stereoscopic viewing can be provided to two or more viewing persons located in different positions.

Further, when using two or more images (such as the images a1, b1, and c1) that are of the same object from different directions, stereoscopic viewing can be provided even if a viewing person moves, e.g., to the position B from the position A.

Fifth Embodiment

Hereafter, a fifth embodiment that realizes one or more aspects of the present invention is described with reference to FIGS. 18 through 21. An image display system and an image display method for providing flexible stereoscopic viewing are described, wherein one of the two eyes is available for seeing the external world. According to the fifth embodiment, stereoscopic viewing is provided by a first view image on a display 120 for displaying a different image according to a viewing position, and a second view image displayed on a display 112 of a single eye head mount display HMD 110. That is, the display constitutes a real image presentation unit and the single eye head mount display constitutes a virtual image presentation unit. Here, the description is made for the case wherein the single eye head mount display HMD 110 is worn for the left eye.

Figure 18:
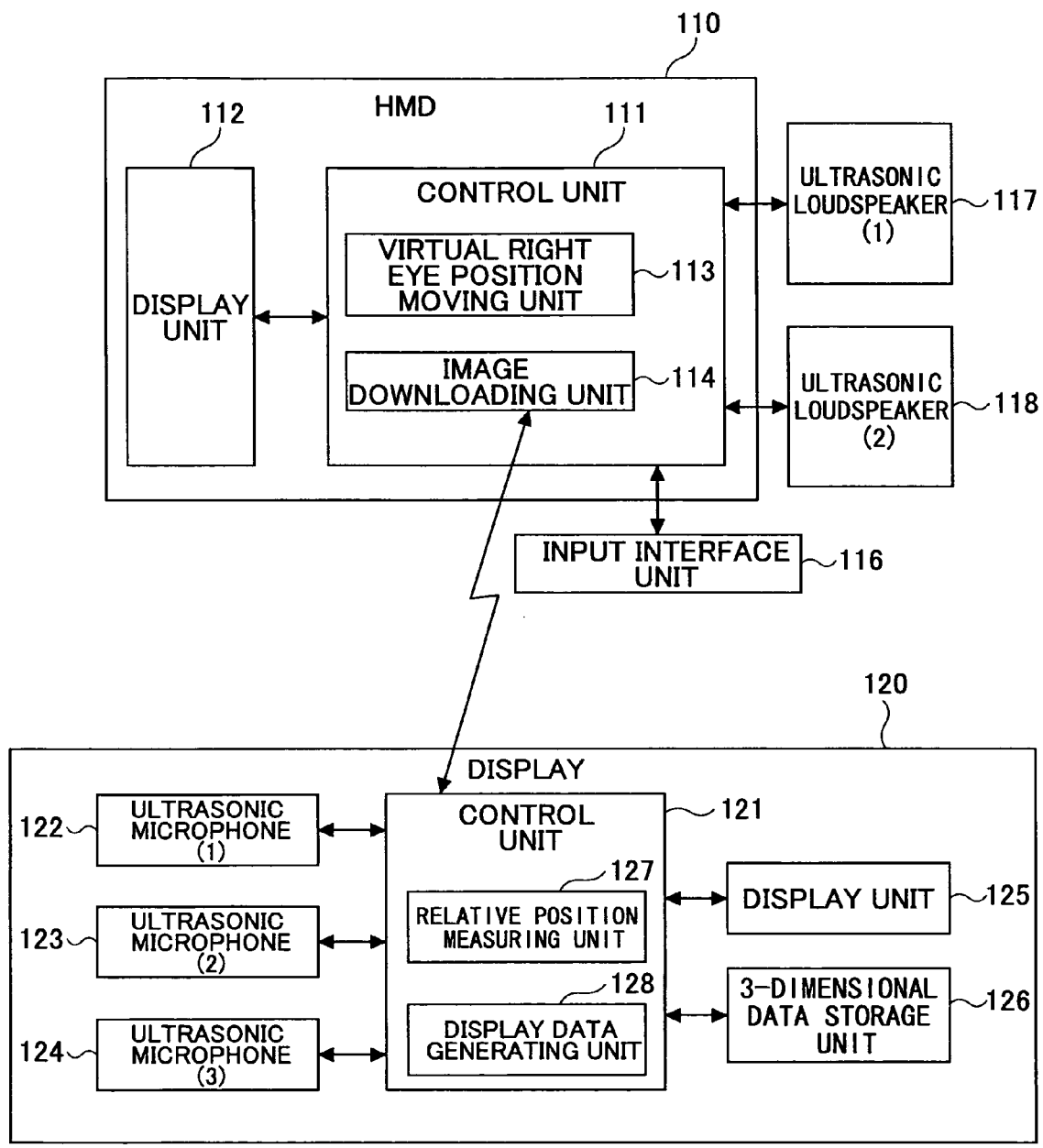
FIG. 18 is a block diagram of the image display system according to the fifth embodiment of the present invention.
Figure 19:
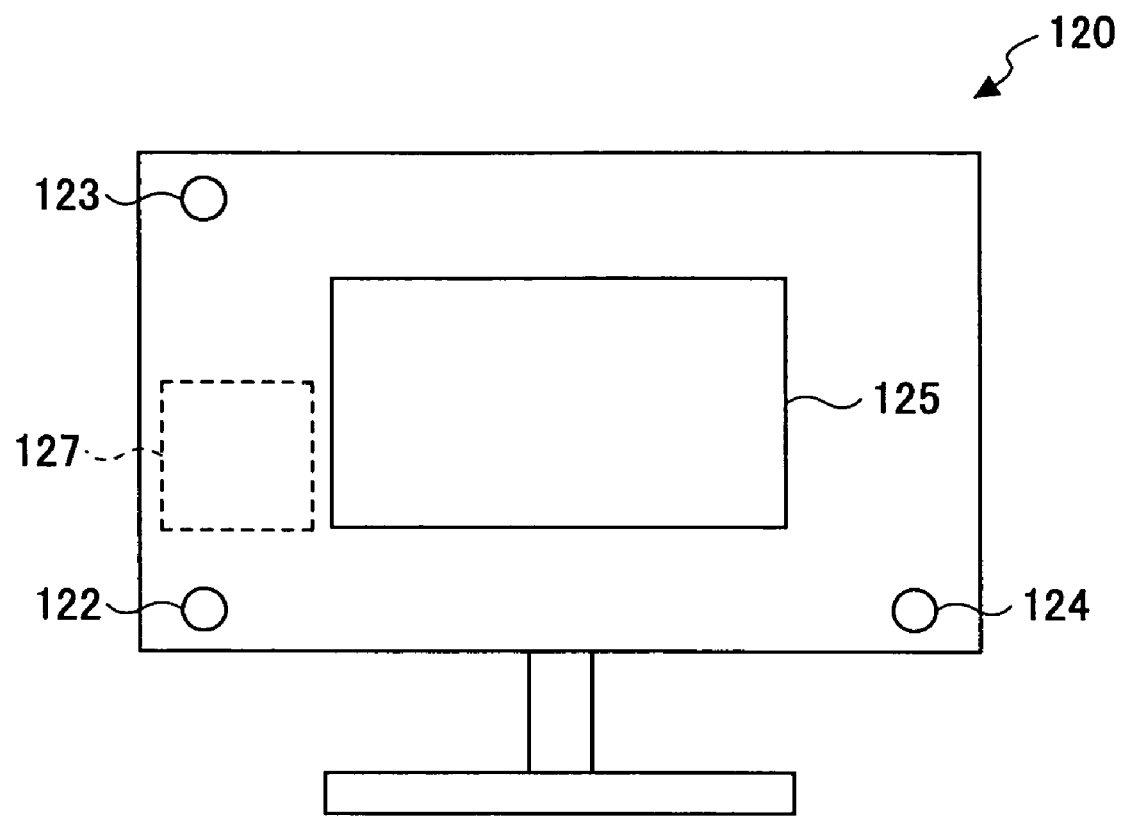
FIG. 19 is a schematic diagram of a display that includes an ultrasonic microphone.

The single eye head mount display HMD 110 includes a control unit 111 that is connected to the display 112 as shown in FIG. 18. The control unit 111 includes CPU, RAM, and ROM (not illustrated), and performs a process that is described below.

The control unit 111 includes a virtual right eye position moving unit 113, and an image downloading unit 114 that carry out the process according to a program.

Figure 21:
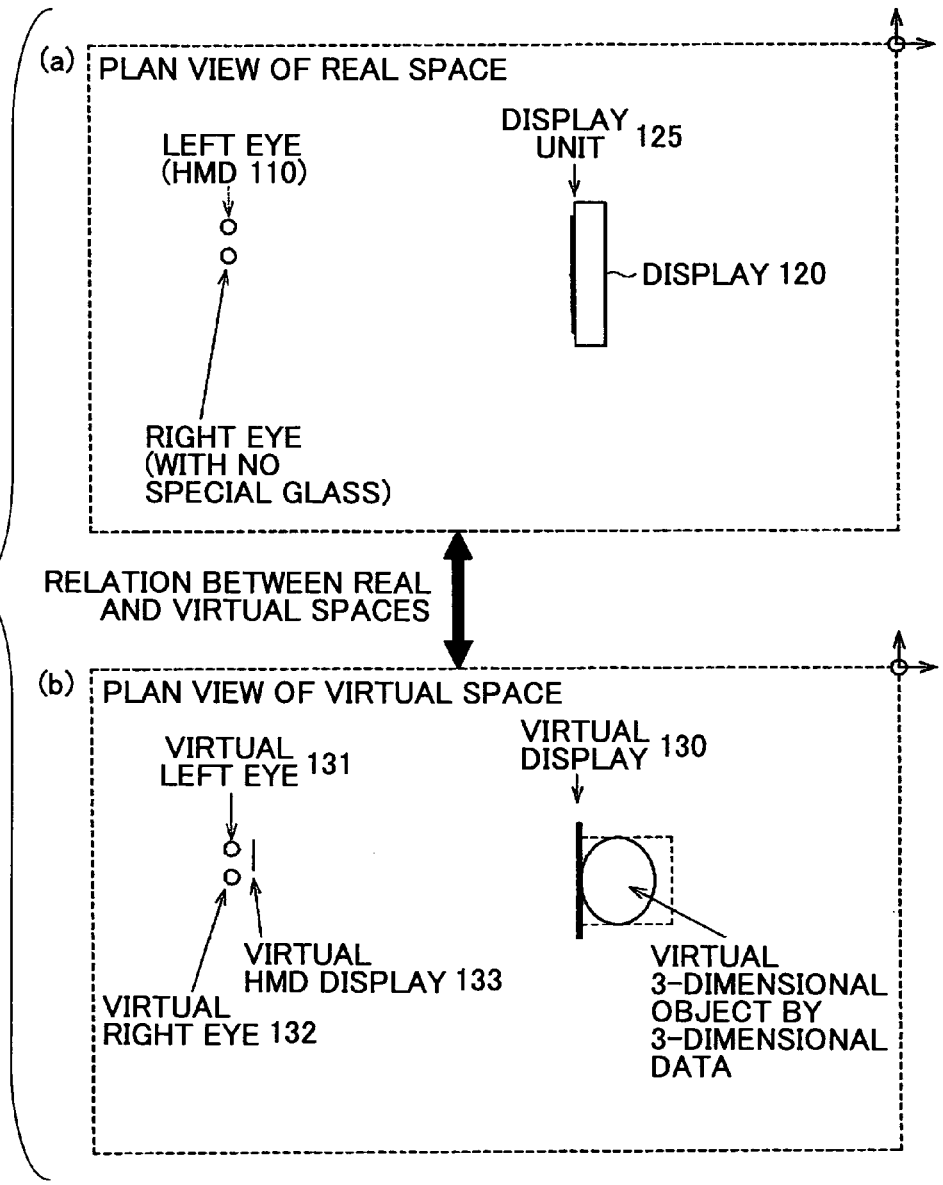
FIG. 21 is a schematic diagram showing a correspondence between an actual space (a) and a virtual space (b).

The virtual right eye position moving unit 113 carries out a parallel movement of the position of a virtual right eye 132 (refer to FIG. 21).

The image downloading unit 114 downloads a virtual HMD image to be displayed on the HMD 110 from the display 120.

The display 112 displays information that is processed and output by the control unit 111.

Further, ultrasonic loudspeakers 117, and 118 are mounted on the HMD 110, and are connected to the control unit 111. The ultrasonic loudspeakers 117, and 118 generate ultrasonic waves of different wavelengths. When wearing the HMD 110, the viewing person makes a direction of a visual line of the left eye that wears the HMD 110 to be perpendicular to a line constituted by the ultrasonic loudspeaker 117 and the ultrasonic loudspeaker 118; and a line constituted by the left eye and right eye of the viewing person to be parallel with the line constituted by the ultrasonic loudspeaker 117 and the ultrasonic loudspeaker 118.

Further, an input interface 116 is connected to the control unit 111. The input interface 116 includes a pointing device, such as a mouse, for adjusting an image being displayed on the display 112.

Here, the HMD 110 may be connected to the display 120 by a cable or radio. The display 120 includes a control unit 121 that is connected to ultrasonic microphones 122, 123, 124, a display unit 125, and a 3-dimensional data storing unit 126.

The control unit 121 includes CPU, RAM, ROM, and a hard disk (not illustrated) for carrying out a process that is described below. The control unit 121 includes a relative position measuring unit 127, and a display image generation unit 128 that carry out the process by a program.

The relative position measuring unit 127 determines the relative position (distance, direction, and inclination) of the HMD 110 to the display 120 by the ultrasonic microphones 122, 123, and 124 receiving the ultrasonic waves transmitted by the ultrasonic loudspeakers 117, and 118. That is, the ultrasonic loudspeakers 117, and 118, the ultrasonic microphones 122, 123, and 124, and the relative position measuring unit 127 function as a relative position specification.

The display image generation unit 128 generates a virtual HMD image, and a virtual display image to be displayed on the display 112, and the display unit 125, respectively, from the 3-dimensional data stored in the 3-dimensional data storing unit 126 and based on the relative position information acquired by the relative position measuring unit 127.

The ultrasonic microphones 122, 123, and 124 are for receiving ultrasonic waves, and receive the ultrasonic waves transmitted by the ultrasonic loudspeakers 117, and 118 of the HMD 110 according to the present embodiment. The ultrasonic microphone 122 is located at a lower left corner of the front unit of the display 120 as shown FIG. 19. The ultrasonic microphone 123 is located at an upper left corner of the front unit of the display 120, and is located on the vertical line of the ultrasonic microphone 122. The ultrasonic microphone 124 is located at a lower right corner of the front unit of the display 120, and is located on the horizontal line of the ultrasonic microphone 122.

The display unit 125 displays the virtual display image generated by the display image generation unit 128.

The 3-dimensional data storing unit 126 stores the 3-dimensional data for generating the images to be displayed on the display 112 and the display unit 125. Here, according to the present embodiment, the 3-dimensional data are beforehand stored in the 3-dimensional data storing unit 126, wherein operations such as storing and exchanging of 3-dimensional data stored in the 3-dimensional data storing unit 126 may be performed by an interface (not illustrated). Further, as the 3-dimensional data, data generated by general 3-dimensional description languages, such as VRML, are used.

In the same way as in the first through the fourth embodiments, the viewing person wears the HMD 110 so that the display 112 is located in front of one of the eyes, the other eye viewing the display 120.

Figure 20:
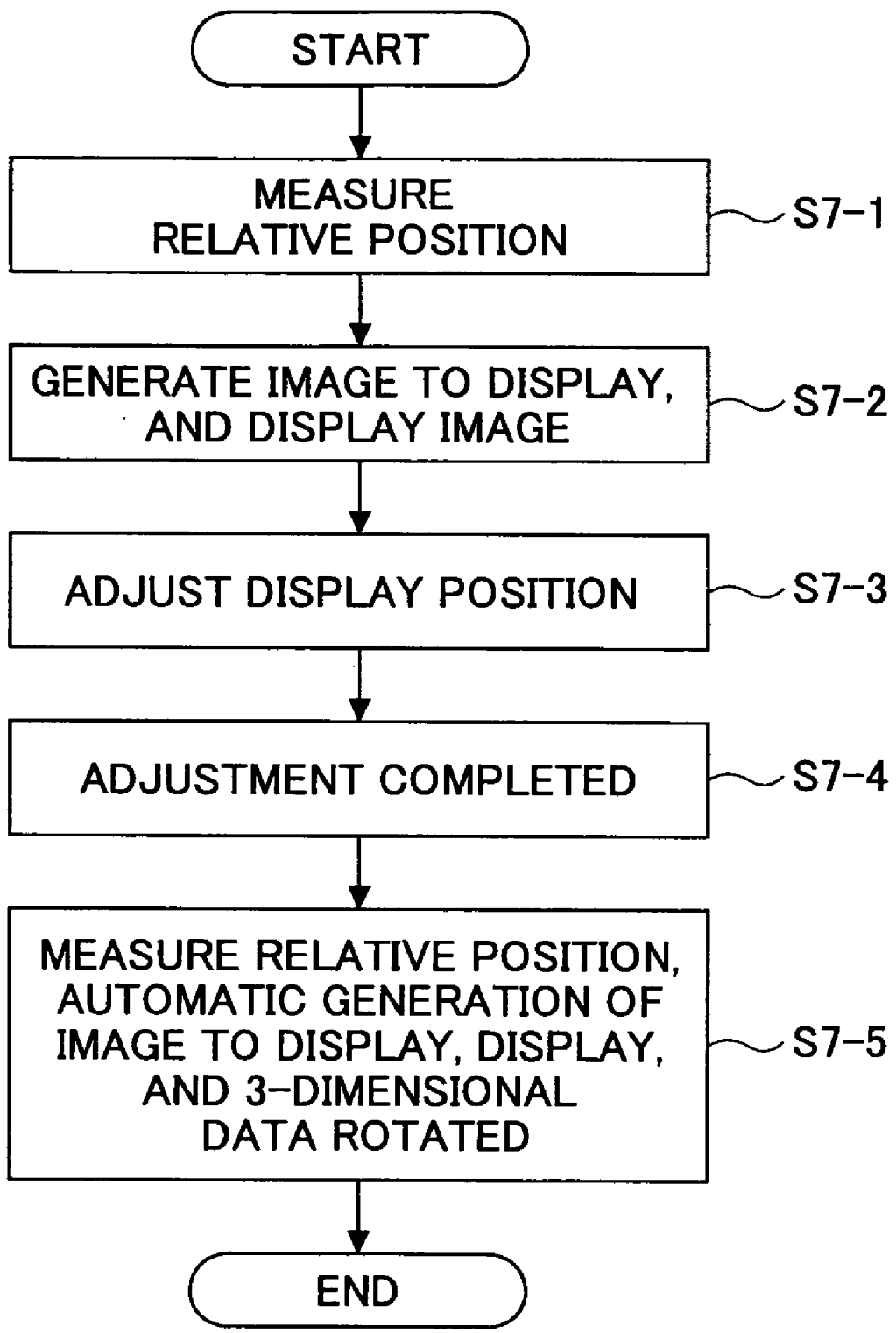
FIG. 20 is a flowchart of a process according to the fifth embodiment.

An exemplary process of stereoscopic viewing a 3-dimensional image using the image display system is described with reference to FIG. 20.

First, the viewing person wears the HMD 110 as described above. The ultrasonic microphones 122, 123, and 124 attached to the display 120 receive the ultrasonic waves of different frequencies transmitted by the ultrasonic loudspeakers 117, and 118 attached to the HMD 110. Based on this, the relative position measuring unit 127 computes the relative position of the HMD 110 from a reference point (Step S7-1). Here, a center position of the screen of the display unit 125 of the display 120 is made into the reference point according to the present embodiment.

Then, the HMD 110 downloads the virtual HMD image generated by the display image generation unit 128 of the display 120, and displays it on the display 112 (Step S7-2). On the other hand, the display 120 synchronously displays the virtual display image generated by the display image generation unit 128 on the display unit 125.

In the following, a process of generating the virtual display image and the virtual HMD image by the display image generation unit 128 is described referring to FIG. 21. The display image generation unit 128 arranges a virtual 3-dimensional object by 3-dimensional data, a virtual left eye 131, and a virtual right eye 132 in a virtual space (refer to (b) of FIG. 21), and generates the virtual display image and the virtual HMD image based on relative positions between these items.

By this process, the virtual 3-dimensional object based on the 3-dimensional data is arranged at a position corresponding to the display 120 in the actual space, and images to be viewed by each of the eyes are acquired.

<Generating the Virtual Space>

As shown in a lower half of FIG. 21 (i.e., at (b)), a virtual display 130, the virtual left eye 131, the virtual right eye 132, and a virtual HMD display 133 are arranged in the virtual space; and the virtual 3-dimensional object by the 3-dimensional data is arranged inside the virtual display 130 (on the side opposite to the virtual left eye 131). Here, the items describe above correspond to the items arranged in the actual space that is shown in an upper half of FIG. 21 (i.e., at (a)). More specifically, this is carried out as follows. Here, it is assumed that the HMD 110 is worn for the left eye.

Here, a rectangular coordinate system is used as the coordinate system of the actual space, and the upper right corner indicated by "0" at (a) of FIG. 21 is made into the point of origin; and a rectangular coordinate system is used as the coordinate system of the virtual space are made into a rectangular coordinate system, and the upper right corner indicated by "0" at (b) of FIG. 21 is made into the point of origin. Then, an absolute coordinate X1 where the display unit 125 is present in the actual space is computed, and the virtual display 130 is arranged to the absolute coordinate X1 in the virtual space.

Next, an absolute coordinate X2 of the HMD 110 is computed using the relative position acquired by the relative position measuring unit 127. Then, the virtual left eye 131 is arranged to the absolute coordinate X2 in the virtual space. Thus, the absolute coordinate X2 of the HMD 110 in the actual space differs from an absolute coordinate of the left eye. For this reason, if a highly precise arrangement of the virtual left eye is desired, a difference between a coordinate of the left eye and the HMD 110 when wearing the HMD 110 may be beforehand measured, and applied to the absolute coordinate X2; further, a coordinate difference predetermined with reference to a sample person may be used.

Next, an absolute coordinate of the virtual right eye is computed, and the virtual right eye 132 is arranged. The absolute coordinate of the virtual right eye is computed based on the absolute coordinate of the virtual left eye 131, amounts of rotations of the virtual left eye 131 in three directions, namely, pan, tilt, and roll, computed by the relative position measuring unit 127, and a relative vector of the right eye. Here, an initial value of the relative right eye position vector is set at a vector length of 60 mm (the standard length between a person's eyes), and a vector direction being perpendicular to the line of sight, and parallel with a straight line between the ultrasonic loudspeaker 117 and the ultrasonic loudspeaker 118. Further, the vector length and the vector direction of the relative right eye position vector can be adjusted at Step S7-3 where the display position is adjusted.

Then, an absolute coordinate X3 of a position of the virtual image displayed by the display 112 is computed, and a virtual HMD display 133 is arranged at the absolute coordinate X3 of the virtual space.

Arrangement of the 3-dimensional data is performed as follows.

First, a cube is prepared, one side of which cube is equal to a vertical length of the display unit 125. Then, the cube is arranged such that the center of gravity of a virtual 3-dimensional object expressed by the 3-dimensional data may come to the center of the cube. Then, the virtual 3-dimensional object is expanded or reduced such that the virtual 3-dimensional object may be inscribed in the cube, that is, normalized. During this process, the center of gravity of the virtual 3-dimensional object is maintained at the center of the cube. Then, the virtual 3-dimensional object is arranged in the virtual space so that a surface of the cube may be in agreement with the virtual display 130. Here, it should be noted that the cube is used only for normalizing the virtual 3-dimensional object, and is present in the virtual space.

<Generating the Virtual HMD Image and the Virtual Display Image>

A virtual camera is arranged in the virtual space, and virtually takes an image of the virtual 3-dimensional object expressed by the 3-dimensional data, wherein the virtual HMD display 133 serves as an image-taking plane, and the virtual left eye 131 serves as a focal point. An image photographed with the virtual camera is made into the virtual HMD image.

Similarly, a virtual camera is arranged in the virtual space, and virtually takes an image of the virtual 3-dimensional object expressed by the 3-dimensional data, wherein the virtual display 130 serves as the image-taking plane, and the virtual right eye serves as the focal point. An image photographed with the virtual camera is made into the virtual display image.

The virtual HMD image and the virtual display image are generated as described above.

As required, a display position adjustment may be carried out by the viewing person (Step S7-3). More specifically, the viewing person inputs a direction to adjust the position of the image in the display 112 using the input interface 116. In response to the direction, the virtual right eye position moving unit 113 changes the relative right eye position vector. When a position that provides stereoscopic viewing of the image shown by the display 112 is obtained, the viewing person inputs a direction of completion of the adjustment to the input interface 116 to end the adjustment (Step S7-4). The control unit 111 of the HMD 110 provides the relative right eye position vector that has been adjusted to the display 120, while storing the relative right eye position vector in a storage unit (not illustrated) of the virtual right eye position moving unit 113. The display 120 stores the relative right eye position vector in a storage unit (not illustrated) of the display image generation unit 128. Henceforth, the relative right eye position vector is used for calculation of the absolute coordinate of the virtual right eye 132.

Henceforth, the relative position is consecutively measured; when the relative position is changed, generation and displaying of a display image is automatically repeated; when a rotation direction of a 3-dimensional image is input, according to the rotation direction, the virtual 3-dimensional object is rotated, and generation and displaying of the display image is repeated (Step S7-5). More specifically, it is carried out as follows.

The relative position measuring unit 127 of the display 120 continuously measures the relative position between the HMD 110 and the display 120; whenever there is a change in the relative position, the virtual HMD image and the virtual display image are generated based on the relative position and the relative right eye position vector at the time of the completion of adjustment; and displaying on the display 112 and the display unit 125 is repeated.

Further, the viewing person is able to direct a rotational movement of the virtual 3-dimensional object around the center of gravity using the input interface 116, when viewing, e.g., the back side of the virtual 3-dimensional object. When the direction is received, the display image generation unit 128 of the display 120 carries out the rotational movement of the virtual 3-dimensional object around the center of gravity of the virtual 3-dimensional object in the virtual space based on the direction of the rotational movement received from the HMD 110. Then, using the relative right eye position vector at the time of the completion of adjustment and the relative position, the virtual HMD image and the virtual display image are repeatedly generated and displayed on the display 112 and the display unit 125, respectively, as described above.

Here, the present embodiment is described about the display unit 125 of the display 120 being flat; however, it does not have to be flat. The surface of the display unit may be of, for example, a curved surface such as a spherical surface.

According to an embodiment of the invention, the following effects are obtained in addition to one or more of the effects described above.

(17) The relative position between the HMD 110 and the display 120 is determined by the ultrasonic loudspeakers 117, and 118, the ultrasonic microphones 122, 123, and 124, and the relative position measuring unit 127. The virtual HMD image and the virtual display image are generated based on the relative position. In this way, the virtual HMD image (virtual image) and the virtual display image (real image) are displayed according to the relative position. Accordingly, when the viewing person moves and the relative position between the HMD 110 and the display 120 is gradually changed, stereoscopic viewing is kept available by gradually changing the virtual display image (real image) displayed on the display 120, and the virtual HMD image (virtual image) displayed on the HMD 110. For this reason, a more real 3-dimensional image is provided to the viewing person. Further, since the display image generation unit 128 of the display 120 generates the display image (the virtual HMD image, and the virtual display image), the processing load of the HMD 110 is mitigated.

(18) The virtual HMD image and the virtual display image are generated based on the 3-dimensional data. For this reason, the 3-dimensional object expressed by the 3-dimensional data can be viewed from any desired direction, for example, the back side of the object can be viewed by giving the direction to rotationally move the image.

The embodiments described above may be modified in various ways, and examples of modifications are described in the following.

According to the first through the second embodiments, the information is coded into the corresponding 2-dimensional codes 42, 67, and 87. Here, the information includes identification information, difference information, and information about the position of the part that is shown with an elevation using parallax, and is used by the HMD 20 and 50 for acquiring an image to be displayed on the HMD 20 and 50. It does not have to be the 2-dimensional code, but the identification information may be recorded on RFID, the information on RFID may be read by an RFID reader, and the image to be displayed on the HMD may be acquired based on this information. Further, the difference information and the information about the position may be recorded on RFID, and the information may be used. In this case, a reference item for determining the position of the image on the paper, and for compensating for tilt may be separately prepared, an example of the reference item being a 2-dimensional code including the information about the relative position of the image, and relative size.

According to the first through the third embodiments, the printed matter for stereoscopic viewing carries applicable one of the stereoscopic image 41, 66, and the map image 86, in addition to the corresponding 2-dimensional codes 42, 67, and 87. Nevertheless, the applicable image and 2-dimensional code may be displayed on a display. Further, an image to be shown as a real image and a corresponding 2-dimensional code may be separately presented for stereoscopic viewing, the image and the corresponding 2-dimensional code being simultaneously used.

According to the third embodiment, the printed matter for stereoscopic viewing carries the map image 86 and the 2-dimensional code 87. Nevertheless, the number of the 2-dimensional codes is not limited to one, but may be two or greater such that 2-dimensional codes containing different elevation data are available for one real image. In this way, the portion to be shown with elevation can be changed.

According to the third embodiment, the display 52 of the HMD 50 shows an image wherein pixel information of an area size 2 is moved to the map image area (8, 1), and pixel information of an area size 2 is moved to (8, 11). Nevertheless, only characters in a specified area can be shown with elevation (3-dimensions). In this case, an image wherein the characters in the specified area ("convenience store" in the case of the example above) are moved to either right or left is displayed on the display 52 of the HMD 50.

According to the fourth embodiment, stereoscopic viewing is of a moving image, however, the present invention can be realized for stereoscopic viewing of a still image.

Further, the present invention is not limited to these embodiments, but variations and modifications may be made without departing from the scope of the present invention.

The present application is based on Japanese Priority Application No. 2005-240235 filed on Aug. 22, 2005 with the Japanese Patent Office, the entire contents of which are hereby incorporated by reference.

What is claimed is:

1. An image display system for stereoscopic viewing a stereoscopic image, comprising:
   a real image presentation unit configured to show a first view image of the stereoscopic image as a real image; and
   a virtual image presentation unit configured to show a second view image of the stereoscopic image as a virtual image, wherein
   the first view image is viewable by one eye of a viewing person, and the second view image is viewable by the other eye of the viewing person, which the first view image and the second view image together form the stereoscopic image,
   the virtual image presentation unit includes an image pick-up unit that is configured to take an image of a code image that indicates an address of the second view image, and
   the virtual image presentation unit is configured to show the second view image, serving as the virtual image, stored at the address indicated by the code image photographed by the image pick-up unit.

2. The image display system as claimed in claim 1, wherein the real image presentation unit is a printed matter.

3. The image display system as claimed in claim 1, wherein the real image presentation unit is a display unit.

4. The image display system as claimed in claim 1, wherein the virtual image presentation unit is configured to display the second view image, serving as the virtual image, based on an image photographed by the image pick-up unit.

5. An image display system for stereoscopic viewing a stereoscopic image, comprising:
   a real image presentation unit configured to show a first view image of the stereoscopic image as a real image; and
   a virtual image presentation unit configured to show a second view image of the stereoscopic image as a virtual image, wherein
   the first view image is viewable by one eye of a viewing person, and the second view image is viewable by the other eye of the viewing person, which the first view image and the second view image together form the stereoscopic image, and
   the virtual image presentation unit includes an image pick-up unit that is configured to take an image of the first view image and a code image, the code image containing data representing differences between the first view image and the second view image, and
   the virtual image presentation unit is configured to generate the second view image based on the first view image and the code image that are photographed by the image pick-up unit, and to show the second view image as the virtual image.

6. An image display system for stereoscopic viewing a stereoscopic image, comprising:
   a real image presentation unit configured to show a first view image of the stereoscopic image as a real image; and
   a virtual image presentation unit configured to show a second view image of the stereoscopic image as a virtual image, wherein
   the first view image is viewable by one eye of a viewing person, and the second view image is viewable by the other eye of the viewing person, which the first view image and the second view image together form the stereoscopic image,
   the virtual image presentation unit includes an image pick-up unit that is configured to take an image of the first view image and a code image, the code image containing coded data that include coded data of information necessary for forming the second view image based on the first view image, and
   the virtual image presentation unit is configured to generate the second view image based on the first view image and the code image that are photographed by the image pick-up unit, and to show the second view image as the virtual image.

7. The image display system as claimed in claim 1, wherein the real image presentation unit is configured to present two or more first view images corresponding to different positions as the real image, and
   the virtual image presentation unit is configured to present the second view image, serving as the virtual image, corresponding to the first view image shown by the real image presentation unit.

8. The image display system as claimed in claim 1, wherein the real image presentation unit is configured to present the first view image as the real image according to a position relation between the virtual image presentation unit and the real image presentation unit, and
   the virtual image presentation unit is configured to present the second view image as the virtual image corresponding to the first view image according to the position relation between the virtual image presentation unit and the real image presentation unit.

9. The image display system as claimed in claim 1, wherein the virtual image presentation unit is a head wearing type single eye display unit.

10. The image display system as claimed in claim 1, further comprising a relative position determining unit configured to determine a relative position between the virtual image presentation unit and the real image presentation unit.

11. The image display system as claimed in claim 10, wherein the relative position determining unit includes the image pick-up unit.

12. The image display system as claimed in claim 1, further comprising a display data transforming unit configured to carry out projective transformation on display data of the second view image shown by the virtual image presentation unit.

13. The image display system as claimed in claim 1, further comprising a display data status selecting unit configured to carry out projective transformation on display data of the second view image displayed by the virtual image presentation unit according to an operation of the viewing person, and to allow the viewing person to select a state of the display data.

14. The image display system as claimed in claim 13, further comprising a relative position determining unit configured to determine a relative position between the virtual image presentation unit and the real image presentation unit, and a display data automatic transformation unit configured to automatically carry out the projective transformation on the display data of the second view image shown by the virtual image presentation unit based on information about the selection of the user by the display data status selecting unit and based on the relative position.

15. An image display method for stereoscopic viewing a stereoscopic image, comprising:
- showing, by a real image presentation unit, a first view image of the stereoscopic image as a real image,
- showing, by a virtual image presentation unit, a second view image of the stereoscopic image as a virtual image, the second view image being based on the first view image; and
- generating a code image that contains coded information about a relative position and relative size between the code image and the stereoscopic image, the code image being appended to the stereoscopic image,
- wherein the first view image, when viewed by one eye of a viewing person, and the second view image, when viewed by the other eye of the viewing person, together form the stereoscopic image.

* * * * *